US012030824B2

(12) United States Patent
Harman et al.

(10) Patent No.: US 12,030,824 B2
(45) Date of Patent: Jul. 9, 2024

(54) HIGHLY EFFECTIVE AND MULTIFUNCTIONAL MICROBIAL COMPOSITIONS AND USES

(71) Applicant: Advanced Biological Marketing, Inc., Van Wert, OH (US)

(72) Inventors: Gary E. Harman, Geneva, NY (US); Molly Cadle-Davidson, Geneva, NY (US); Walid Nosir, Geneva, NY (US)

(73) Assignee: Agrauxine Corp., Milwaukee, WI (US)

( * ) Notice: Subject to any disclaimer, the term of this patent is extended or adjusted under 35 U.S.C. 154(b) by 373 days.

(21) Appl. No.: 16/098,481

(22) PCT Filed: May 2, 2016

(86) PCT No.: PCT/US2016/030392

§ 371 (c)(1),
(2) Date: Nov. 2, 2018

(87) PCT Pub. No.: WO2017/192117

PCT Pub. Date: Nov. 9, 2017

(65) Prior Publication Data

US 2019/0274311 A1 Sep. 12, 2019

(51) Int. Cl.

| | |
|---|---|
| ***A01N 63/38*** | (2020.01) |
| ***A01N 25/04*** | (2006.01) |
| ***A01N 25/30*** | (2006.01) |
| ***C05F 11/08*** | (2006.01) |
| ***C05G 3/00*** | (2020.01) |
| *C05G 3/60* | (2020.01) |

(52) U.S. Cl.

CPC .............. *C05F 11/08* (2013.01); *A01N 25/04* (2013.01); *A01N 25/30* (2013.01); *A01N 63/38* (2020.01); *C05G 3/00* (2013.01); *C05G 3/60* (2020.02)

(58) Field of Classification Search

CPC .... A01N 63/38; A01N 2300/00; A01N 63/32; A01N 25/04; A01N 25/30

See application file for complete search history.

(56) References Cited

U.S. PATENT DOCUMENTS

| | | | | |
|---|---|---|---|---|
| 9,249,061 | B2 * | 2/2016 | Harman | C05D 9/02 |
| 2013/0276493 | A1 * | 10/2013 | Johnson | C12N 1/20 71/8 |
| 2014/0323297 | A1 | 10/2014 | Harman et al. | |
| 2015/0282491 | A1 | 10/2015 | Kritzman | |
| 2016/0015029 | A1 | 1/2016 | Baseeth | |
| 2016/0081351 | A1 | 3/2016 | Jackson et al. | |

FOREIGN PATENT DOCUMENTS

| | | | | |
|---|---|---|---|---|
| CN | 104446895 | A * | 3/2015 | C05F 11/00 |
| CN | 105130577 | A * | 12/2015 | |
| WO | 2006060213 | A2 | 6/2006 | |
| WO | 2010122501 | A2 | 10/2010 | |
| WO | 2015011615 | A1 | 1/2015 | |

OTHER PUBLICATIONS

Hung, Fungal volatile organic compounds and their effect on seed germination and plant growth in *Arabidopsis thaliana*, Dissertation for Rutgers State University, 2014 (Year: 2014).*

Santoyo, et al., "Mechanisms of biocontrol and plant growth-promoting activity in soil bacterial species of *Bacillus* and *Pseeudomonas*: a review"; Biocontrol Science and Technology; vol. 22, No. 8; Aug. 2012; 19 pgs.

Pertot, I, et al. European Commission, eip-agri agriculture & innovation, Focus group: Soil-borne diseases, Mini-paper—The use of microbial biocontrol agents against soil-borne diseases, Nov. 2014-Oct. 2015, pp. 1-11, See pp. 3, 6-8.

Int'l Search Report for PCT/US2016/030392, dated Jan. 11, 2017.

English Translation of the Preliminary Office Action Report regarding related Pat. App. No. BR112018072575-7; issued Feb. 27, 2020.

Rinu; K., et al.; Trichoderma gamsii (NFCCI 2177): A newly isolated endophytic, psychrotolerant, plant growth promoting, and antagonistic fungal strain; Dated 2013 (10 pages).

Mexican Office Action for MX Application No. MX/a/2018/013444 dated Jul. 27, 2023 (13 pages).

* cited by examiner

*Primary Examiner* — Johann R Richter
*Assistant Examiner* — Danielle Johnson
(74) *Attorney, Agent, or Firm* — Reising Ethington P.C.

(57) ABSTRACT

The disclosure generally describes the discovery of a train of *Trichoderma gamsii* (NRRL B-50520) that has multiple capabilities for various uses in plant agriculture and development of systems for its use. This patent application compares its abilities to enhance plant agriculture for a number of applications with a number of other microbial agents and that are contained within useful formulations. While other strains or mixtures have abilities to confer one trait or another, this strain appears to be uniquely versatile in its capabilities. It can be used in conventional or organic agriculture for the promotion of plant growth and increase in crop yields when applied topically as a foliar spray or as a seed coating. The highly active products also are expected to increase plant productivity and improve quality of fruits, vegetables, flowers or other plant products.

6 Claims, 13 Drawing Sheets

A

B

A

B

A

B

C

HIGHLY EFFECTIVE AND MULTIFUNCTIONAL MICROBIAL COMPOSITIONS AND USES

TECHNICAL FIELD OF THE INVENTION

The present technology relates generally to compositions and methods of a highly effective and multifunctional strain of *Trichoderma gamsii* (formerly *T. viride*).

BACKGROUND OF THE INVENTION

The following description is provided to assist the understanding of the reader. None of the information provided or references cited is admitted to be prior art to the present invention. Microbial agents applied as seed treatments or other methods of application have been shown to increase plant growth and development. The most effective of these organisms colonize plant roots internally and induce beneficial changes in gene expression and that therefore give rise to changes in plant physiology. These alternations in plant physiology include coordinated up-regulation of entire biochemical pathways in plants. Nevertheless, the need remains for highly functional seed treatments and applications that improve upon the prior art, where efficient and efficacious changes in this respect include (i) reliable and consistent plant growth and yield promotion, (ii) enhanced root growth and development resulting in larger and deeper root systems, (iii) improved resistance to such abiotic stress including too little or too much water, salt and soil contamination, (iv) increased fertilizer use efficiency and especially nitrogen fertilizer use efficiency, enhanced antioxidant levels in produce, where all of the effects noted above require energy, and can only occur if photosynthesis is enhanced. These microbial agents efficiently improve photosynthesis.

SUMMARY OF THE INVENTION

The present technology relates generally to compositions, methods and systems entailing one or more microbial agents possessing multifunctional capabilities selected from the group consisting of an increase in one or more beneficial plant attributes comprising plant growth, yield, root development, resistance to abiotic stresses, photosynthetic efficiency, reduction of foliar disease, controlling nematodes, inducing systemic changes in plant gene expression, remaining localized in the plant root system, protecting planted seeds from soil-borne pathogens, and controlling populations of insect pests, wherein the increase in the one or more beneficial plant attributes is compared to a plant or plant system without the one or more microbial agents; and an agronomic carrier.

In illustrative embodiments, the agronomic mediator is selected from the group consisting of humic acid, fulvic acid, nitrogen containing proteins, urea, ammonium nitrate, sodium, phosphorous, potassium, calcium, magnesium, sulfur, iron, manganese, magnesium, copper, boron, granule, and/or composite compositions for stimulating the formulation of granules, dust, powders, slurries, films, liquid suspensions, coating, pelleting and/or combinations thereof. In illustrative embodiments, the one or more microbial agents is a single microbial agent possessing all of the one or more beneficial plant attributes. In illustrative embodiments, the one or more agronomic mediators and/or the at least one microbial agent and/or an additional ingredient, possess constituents, alone or in combination, that do not naturally occur together in nature.

In illustrative embodiments, the single microbial agent is *Trichoderma gamsii* (NRRL B-50520). In illustrative embodiments, the agronomic carrier is selected from the group consisting of composite compositions for stimulating the formulation of granules, dust, powders, slurries, films, liquid suspensions, coating, pelleting and/or combinations thereof. In illustrative embodiments, the compositions further comprise the active ingredient Omega (1-octen-3-ol). In illustrative embodiments, the compositions further comprise an adjuvant. In illustrative embodiments, the adjuvant is selected from humic acid, fumic, acid, a plant nutrient source, and yeast extract, among others, and combinations thereof. In illustrative embodiments, the planting medium is a wax, liquid, solid, aerosol, semi-solid, slurry and combinations thereof. In illustrative embodiments, the one or more nutrients and/or adjuvants are selected from the group consisting of humic acid, fulvic acid, nitrogen containing proteins, urea, ammonium nitrate, sodium, phosphorous, potassium, calcium, magnesium, sulfur, iron, manganese, magnesium, copper, and boron, and combinations thereof.

In illustrative embodiments, the abiotic stresses are selected from the group consisting of drought, osmotic stress, increased or decreased salinity and flooding. In illustrative embodiments, the photosynthetic efficiency increases more under stress conditions compared to unstressed conditions. In illustrative embodiments, the soil-borne pathogens are selected from the group consisting of *Fusarium, Pythium* and *Rhizoctonia solani*, and combinations thereof. In illustrative embodiments, the nematode control is demonstrated by inhibition of egg laying, root galling and/or numbers of nematodes. In illustrative embodiments, the insects pests are white flies and/or aphids. In illustrative embodiments, the microbial metabolite, or mixture of microbial metabolites, that increases the resistance of plants to pests and diseases is included. In illustrative embodiments, the metabolites are derived from *Trichoderma* spp. In illustrative embodiments, the metabolites may include 6-pentyl pyrone, harzianic acid, hydtra 1, harzinolide and/or 1-octene-3-ol. In illustrative embodiments, the metabolites are derived from *Bacillus* spp.

In illustrative embodiments, the metabolites include sufactin, iturin, fengycin various forms of these, and other bacterial metabolites including polyketides. In illustrative embodiments, the one or more microbial agents is a combination of two or more species of *Trichoderma, Clonostachys, Bacillus* or *Pseudomonas* spp. In illustrative embodiments, the compositions further comprise an optional, non-naturally occurring, constituent.

In one aspect, the present technology entails a method comprising selecting one or more microbial agents possessing multifunctional capabilities selected from the group consisting of an increase in one or more beneficial plant attributes comprising plant growth, yield, root development, resistance to abiotic stresses, photosynthetic efficiency, reduction of foliar disease, controlling nematodes, inducing systemic changes in plant gene expression, remaining localized in the plant root system, protecting planted seeds from soil-borne pathogens, and controlling populations of insect pests, wherein the increase in the one or more beneficial plant attributes is compared to a plant or plant system without the one or more microbial agents; selecting an agronomic mediator selected from the group consisting of an adjuvant, a carrier, a planting medium, and/or one or more nutrients, wherein at least one component of the agronomic mediators does not naturally occurring in combination with the one or more microbial agents; and contacting a plant or plant system with the one or more microbial agents and agronomic mediators.

In illustrative embodiments, the method entails contacting is selected from a means or group consisting of broadcast application, aerosol application, spray-dried application, liquid, dry, powder, mist, atomized, semi-solid, gel, coating, lotion, linked or linker material, material, in-furrow application, spray application, irrigation, injection, dusting, pelleting, or coating of the plant or the plant seed or the planting medium with the agent. In illustrative embodiments, the method entails contacting or application occurs at any time and in any amount sufficient to effectuate the one or more beneficial plant attributes. In illustrative embodiments, the method entails one or more beneficial plant attributes further comprises plant enhancement, sustainability, durability, strength, increase, and/or benefit. In illustrative embodiments, the method entails the one or more microbial agents and agronomic mediators are applied in a separate, simultaneous, or sequential manner.

In illustrative embodiments, the method entails the one or more microbial agents is a single microbial agent possessing all of the one or more beneficial plant attributes. In illustrative embodiments, the single microbial agent is *Trichoderma gamsii* (NRRL B-50520). In illustrative embodiments, the agronomic carrier is selected from the group consisting of composite compositions for stimulating the formulation of granules, dust, powders, slurries, films, liquid suspensions, coating, pelleting and/or combinations thereof. In illustrative embodiments, the compositions further comprise Omega (1-octen-3-ol) as an active ingredient. In illustrative embodiments, the planting medium is a wax, liquid, solid, aerosol, semi-solid, slurry and combinations thereof.

In illustrative embodiments, the one or more nutrients selected from the group consisting of humic acid, fulvic acid, nitrogen containing proteins, urea, ammonium nitrate, sodium, phosphorous, potassium, calcium, magnesium, sulfur, iron, manganese, magnesium, copper, and boron, and combinations thereof. In illustrative embodiments, the abiotic stresses are selected from the group consisting of drought, osmotic stress, increased or decreased salinity and flooding. In illustrative embodiments, the photosynthetic efficiency increases more under stress conditions compared to unstressed conditions. In illustrative embodiments, the soil-borne pathogens are selected from the group consisting of *Fusarium, Pythium* and *Rhizoctonia solani*, and combinations thereof. In illustrative embodiments, the nematode control is one or more of: an inhibition of egg laying, reduction in root galling, or reduction in nematode numbers in soil surrounding roots.

In illustrative embodiments, the insects pests are white flies and/or aphids. In illustrative embodiments, the microbial metabolite, or mixture of microbial metabolites, that increases the resistance of plants to pests and diseases is included. In illustrative embodiments, the metabolites are derived from *Trichoderma* spp. In illustrative embodiments, the metabolites may include 6-pentyl pyrone, harzianic acid, hydtra 1, harzinolide and/or 1-octene-3-ol. In illustrative embodiments, the metabolites are derived from *Bacillus* spp. In illustrative embodiments, the metabolites include sufactin, iturin, fengycin various forms of these, and other bacterial metabolites including polyketides. In illustrative embodiments, the one or more microbial agents is a combination of two or more species of *Trichoderma, Clonostachys, Bacillus* or *Pseudomonas* spp.

In one aspect, the technology entails a method, system or composition for pest or disease control comprising an emulsion containing water and a vegetable oil in ratios of about 1:1 (ranging to 0.5:4), lecithin (0.5 to 1.2% w:v) and sufficient surfactant to form a stable emulsion that can be diluted more than 100-fold in water without phase separation. In illustrative embodiments, the methods further comprising adding sodium stearate or other fatty acid at a range of 1 to 3% by weight of the concentrate before dilution are included. In illustrative embodiments, the vegetable oil is any available oil, preferably soy, corn, canola or safflower.

In illustrative embodiments, the lecithin is from any commercial source, including plant and animals, including soy and egg. In illustrative embodiments, the microbial metabolite, or mixture of microbial metabolites, that increases the resistance of plants to pests and diseases is included. In illustrative embodiments, the metabolites are derived from *Trichoderma* spp. In illustrative embodiments, the metabolites may include 6-pentyl pyrone, harzianic acid, hydtra 1, harzinolide and/or 1-octene-3-ol. In illustrative embodiments, the metabolites are derived from *Bacillus* spp. In illustrative embodiments, the metabolites include sufactin, iturin, fengycin various forms of these, and other bacterial metabolites including polyketides.

In illustrative embodiments, the contacting is carried out by broadcast application, liquid or dry in-furrow application, spray application, irrigation, injection, dusting, pelleting, or coating of the plant or the plant seed or the planting medium with *Trichoderma* strain. In illustrative embodiments, the bacteria are selected from *Bacillus* or *Pseudomonas* spp. In illustrative embodiments, the emulsion contains water and a vegetable oil in ratios of about 1:1 (ranging to 0.5:4), lecithin (0.5 to 1.2% w:v) and sufficient surfactant to form a stable emulsion that can be diluted more than 100-fold in water without phase separation. In one aspect, the technology entails a method of biomass enrichment for agricultural ecosystems, comprising: (a) providing one or more biomodulators capable of promoting vascular plant performance; (b) allowing the one or more biomodulators to interact with at least one species of vascular plant, wherein the interaction enhances the photosynthetic efficiency (bioresource or photosynthate) of the at least one species of vascular plant; and (b) maintaining maximal root cortex growth of the at least one species of vascular plant to enrich soil biomass, wherein the enriched biomass promotes the reservoir capacity of the soil for elemental uptake and storage. In illustrative embodiments, the methods optionally further comprising the step of adding a non-naturally occurring constituent.

In one aspect, the present disclosure provides methods, systems and compositions for enhancing growth of plants, increasing crop yield, enhancing resistance of plants to abiotic stresses, enhancing photosynthesis, enhancing plant metabolism, facilitating delivery of an agent, enhancing germination, root development, increasing antioxidant levels, leaching of nitrates into soil and water, enhancing activity of many commercial and potential herbicides and/or reducing plant pests comprising: a. applying an agent to one or more locations in, on, around, proximal and/or by a plant, seed, crop, root, or organism of interest, or any other component of the methods and systems disclosed herein, wherein the application occurs at the location and/or in such a way that impacts the plant or organism of interest in a beneficial manner; and wherein, b. the agent comprises one or more components capable of effecting the enhancement, sustainability, durability, strength, increase, and/or benefit.

In illustrative embodiments, the bioresource is the photosynthate, and/or further wherein the plant is rhizosphere competent, and/or wherein the biomass increase is mediated by the rooted plant, and/or wherein the interaction mediates the modulation of the soil reservoir capacity for elemental uptake and storage. In illustrative embodiments, the plant is selected from the group consisting of alfalfa, rice, wheat, barley, oats, rye, cotton, sorghum, sunflower, peanut, potato, sweet potato, bean, pea, chicory, lettuce, endive, cabbage, brussels sprout, beet, parsnip, turnip, cauliflower, broccoli, radish, spinach, onion, garlic, eggplant, pepper, celery, carrot, squash, pumpkin, zucchini, cucumber, apple, pear, melon, citrus, strawberry, grape, raspberry, pineapple, soybean, tobacco, tomato, maize, clover, sugarcane, Arabidopsis thaliana, Saintpaulia, petunia, pelargonium, poinsettia, chrysanthemum, carnation, zinnia, roses, snapdragon, geranium, zinnia, lily, daylily, Echinacea, dahlia, hosta, tulip, daffodil, peony, phlox, herbs, ornamental shrubs, ornamental grasses, switchgrass, and turfgrass, or any other plant or seed or crop, or combinations thereof.

In illustrative embodiments, the application is selected from a means or group consisting of broadcast application, aerosol application, spray-dried application, liquid, dry, powder, mist, atomized, semi-solid, gel, coating, lotion, linked or linker material, material, in-furrow application, spray application, irrigation, injection, dusting, pelleting, or coating of the plant or the plant seed or the planting medium with the agent. In illustrative embodiments, the application occurs at any time and in any amount sufficient to effectuate the enhancement, sustainability, durability, strength, increase, and/or benefit. In illustrative embodiments, the agent is applied with a second or additional agents in a separate, simultaneous, or sequential manner.

In illustrative embodiments, the agent is selected from the group consisting of one or more of a biological agent, an adjuvant, an acid, a base, a palette, a GMO-free agent, a herbicidal agent, a pesticidal agent, a growth promoting agent, a microbe, one or more bacterial species, viral species, fungal species, yeast species, plant species, spores, cellular components, metabolites, compounds, surfactants, emulsifiers, metals, elements, nutrients, derivatives, media, medium, *Trichoderma* strains K1, K2, K3, K4, K5, and *Bacillus* strains As1, As2, As3, As4 and As5, and or any other compositions, mixtures, agents described herein, and/or combinations thereof. In some embodiments, the agent is, alone or in combination with the other microbial strains recited herein, selected from the group consisting of (a) *Trichoderma* strains K1 and K5, (b) *Bacillus* strains TR4, As3, As2, and Ph1, and (iii) *Bacillus* strains HHHB and TRH13, and combinations thereof. In illustrative embodiments, the pest or the pest control comprises pests or controls selected form the group consisting of nematodes, insects, arthropods, animals, microbes, one or more bacterial species, viral species, fungal species, yeast species, prions, plant species, spores, and/or systemic foliar disease control, or any combination thereof. In illustrative embodiments, the methods optionally further comprising the step of adding a non-naturally occurring constituent.

In one aspect, the present technology provides methods for enhancing growth of plants comprising: contacting a *Trichoderma* strain with a plant or a plant seed under conditions effective for the *Trichoderma* strain to colonize the roots of the plant or a plant grown from the plant seed, thereby creating a plant-*Trichoderma* system and growing the plant or plant seed under conditions effective to sustain the plant-*Trichoderma* system in a planting medium and to enhance plant growth, wherein the *Trichoderma* strain is *Trichoderma viride* or *T. gamsii* strain NRRL 50520. In illustrative embodiments, the methods further comprise adding a supplemental source of nutrients to the plant-*Trichoderma* system.

In illustrative embodiments, the nutrients are selected from the group consisting of humic or fulvic acids; soil; water; nitrogen sources including proteins, urea, ammonium nitrate, sodium, phosphorous, potassium, calcium, magnesium, sulfur, iron, manganese, magnesium, copper, boron and/or other micronutrients. In illustrative embodiments, one or more *Trichoderma* strains are provided as a granule, dust, powder, slurry, film, liquid suspension, or combinations thereof. In illustrative embodiments, the contacting is carried out by broadcast application, liquid or dry in-furrow application, spray application, irrigation, injection, dusting, pelleting, or coating of the plant or the plant seed or the planting medium with *Trichoderma* strain.

In illustrative embodiments, the contacting is carried out before the plant or the plant seed is introduced to the planting medium. In illustrative embodiments, the plant or plant seed is a crop plant selected from the group consisting of alfalfa, rice, wheat, barley, oats, rye, cotton, sorghum, sunflower, peanut, potato, sweet potato, bean, pea, chicory, lettuce, endive, cabbage, brussels sprout, beet, parsnip, turnip, cauliflower, broccoli, radish, spinach, onion, garlic, eggplant, pepper, celery, carrot, squash, pumpkin, zucchini, cucumber, apple, pear, melon, citrus, strawberry, grape, raspberry, pineapple, soybean, tobacco, tomato, maize, clover, and sugarcane.

In illustrative embodiments, the plant or plant seed is an ornamental plant selected from the group consisting of Arabidopsis thaliana, Saintpaulia, petunia, pelargonium, poinsettia, chrysanthemum, carnation, zinnia, roses, snapdragon, geranium, zinnia, lily, daylily, Echinacea, dahlia, hosta, tulip, daffodil, peony, phlox, herbs, ornamental shrubs, ornamental grasses, switchgrass, and turfgrass. In illustrative embodiments, the plant growth enhancement is in the form of greater root mass, greater depth of rooting, greater shoot mass, greater length of shoots, increased leaf greenness, increased yields, and improved stand or plant vigor. In illustrative embodiments, the methods optionally further comprising the step of adding a non-naturally occurring constituent.

In illustrative embodiments, a method, system and/or composition is provided for enhancing resistance of plants to abiotic stresses comprising: contacting a *Trichoderma* strain with the plant or a plant seed under conditions effective for the *Trichoderma* strain to colonize the roots of the plant or a plant grown from the plant seed, thereby creating a plant-*Trichoderma* system and growing the plant or plant seed under conditions effective to sustain the plant-*Trichoderma* system in a planting medium and to enhance resistance of plants to abiotic stresses, wherein the *Trichoderma* strain is *Trichoderma viride* or *T. gamsii* strain NRRL 50520.

DETAILED DESCRIPTION

Figure 1:
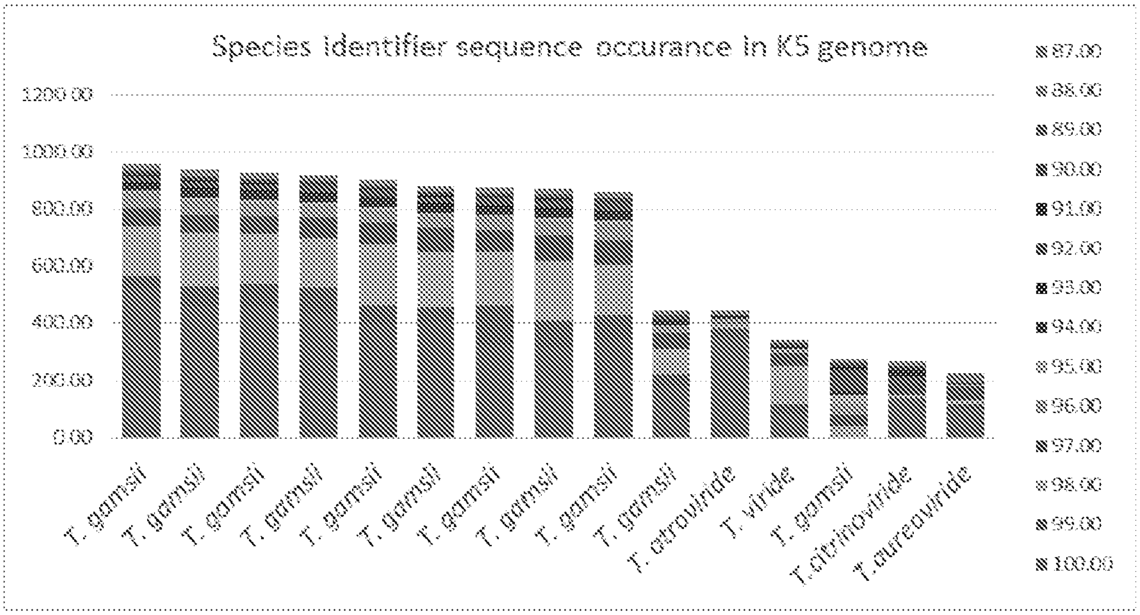
FIG. 1 is a graph showing the number of BLAST hits for species identification genes from the K5 genome. Of the genes that produced hits, those with the greatest frequency and highest sequence identity were all from *Trichoderma gamsii. Trichoderma viride* hits were far less frequent and of lower sequence identity. Number of hits is shown on they axis, results for individual gene sequence search results is on the x axis (shown only as species for ease of reading).

It is to be appreciated that certain aspects, modes, embodiments, variations and features of the invention are described below in various levels of detail in order to provide a substantial understanding of the present invention.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

In practicing the present invention, many conventional techniques in molecular biology, protein biochemistry, cell biology, immunology, microbiology and recombinant DNA are used. These techniques are well-known and are explained in, e.g., *Current Protocols in Molecular Biology*, Vols. I-III, Ausubel, Ed. (1997); Sambrook et al., *Molecular Cloning: A Laboratory Manual*, Second Ed. (Cold Spring Harbor Laboratory Press, Cold Spring Harbor, New York (1989)); *DNA Cloning: A Practical Approach*, Vols. I and II, Glover, Ed. (1985); *Oligonuchotide Synthesis*, Gait, Ed. (1984); *Nucleic Acid Hybridization* Hames & Higgins, Eds. (1985); *Transcription and Translation*, Hames & Higgins, Eds. (1984); *Animal Cell Culture*, Freshney, Ed. (1986); *Immobilized Cells and Enzymes* (IRL Press, 1986); Perbal, *A Practical Guide to Molecular Cloning*; the series, Meth. Enzymol., (Academic Press, Inc., 1984); *Gene Transfer Vectors for Mammalian Cells*, Miller & Calos, Eds. (Cold Spring Harbor Laboratory, New York (1987)); and *Meth. Enzymol.*, Vols. 154 and 155, Wu & Grossman, and Wu, Eds., respectively. Methods to detect and measure levels of polypeptide gene expression products (i.e., gene translation level) are well-known in the art and include the use polypeptide detection methods such as antibody detection and quantification techniques. (See also, Strachan & Read, *Human Molecular Genetics*, Second Edition. (John Wiley and Sons, Inc., New York (1999).)

Unless defined otherwise, all technical and scientific terms used herein generally have the same meaning as commonly understood by one of ordinary skill in the art to which this invention belongs. As used in this specification and the appended claims, the singular forms "a," "an" and "the" include plural referents unless the content clearly dictates otherwise. For example, reference to "a cell" includes a combination of two or more cells, and the like. Generally, the nomenclature used herein and the laboratory procedures in cell culture, molecular genetics, organic chemistry, analytical chemistry and nucleic acid chemistry and hybridization described below are those well-known and commonly employed in the art. All references cited herein are incorporated herein by reference in their entireties and for all purposes to the same extent as if each individual publication, patent, or patent application was specifically and individually incorporated by reference in its entirety for all purposes.

In practicing the present invention, many conventional techniques in molecular biology, protein biochemistry, cell biology, immunology, microbiology and recombinant DNA are used. These techniques are well-known and are explained in, e.g., *Current Protocols in Molecular Biology*, Vols. I-III, Ausubel, Ed. (1997); Sambrook et al., *Molecular Cloning: A Laboratory Manual*, Second Ed. (Cold Spring Harbor Laboratory Press, Cold Spring Harbor, New York, 1989); *DNA Cloning: A Practical Approach*, Vols. I and II, Glover, Ed. (1985); *Oligonucleotide Synthesis*, Gait, Ed. (1984); *Nucleic Acid Hybridization*, Hames & Higgins, Eds. (1985); *Transcription and Translation*, Hames & Higgins, Eds. (1984); *Animal Cell Culture*, Freshney, Ed. (1986); *Immobilized Cells and Enzymes* (IRL Press, 1986); Perbal, *A Practical Guide to Molecular Cloning*; the series, *Meth. Enzymol.*, (Academic Press, Inc., 1984); *Gene Transfer Vectors for Mammalian Cells*, Miller & Calos, Eds. (Cold Spring Harbor Laboratory, NY, 1987); and *Meth. Enzymol.*, Vols. 154 and 155, Wu & Grossman, and Wu, Eds., respectively.

Definitions. The definitions of certain terms as used in this specification are provided below. Definitions of other terms may be found in the Illustrated Dictionary of Immunology, 2nd Edition (Cruse, J. M. and Lewis, R. E., Eds., Boca Raton, FL: CRC Press, 1995). Unless indicated otherwise, the term "biomarker" when used herein refers to the human biomarker, e.g., a human protein and gene. Such definitions of certain terms as used in this specification are provided below. Unless defined otherwise, all technical and scientific terms used herein generally have the same meaning as commonly understood by one of ordinary skill in the art to which this invention belongs.

As used in this specification and the appended claims, the singular forms "a", "an" and "the" include plural referents unless the content clearly dictates otherwise. For example, reference to "a cell" includes a combination of two or more cells, and the like.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the enumerated value.

As used herein, the "administration" of an agent, microbe, compositions, drug, or peptide to a subject plant and/or plant system includes any route or modality of introducing or delivering the agent or composition to perform its intended function.

As used herein, the term "amino acid" includes naturally-occurring amino acids and synthetic amino acids, as well as amino acid analogs and amino acid mimetics that function in a manner similar to the naturally-occurring amino acids. Naturally-occurring amino acids are those encoded by the genetic code, as well as those amino acids that are later modified, e.g., hydroxyproline, γ-carboxyglutamate, and O-phosphoserine. Amino acid analogs refers to compounds that have the same basic chemical structure as a naturally-occurring amino acid, i.e., an a-carbon that is bound to a hydrogen, a carboxyl group, an amino group, and an R group, e.g., homoserine, norleucine, methionine sulfoxide, methionine methyl sulfonium. Such analogs have modified R groups (e.g., norleucine) or modified peptide backbones, but retain the same basic chemical structure as a naturally-occurring amino acid. Amino acid mimetics refers to chemical compounds that have a structure that is different from the general chemical structure of an amino acid, but that functions in a manner similar to a naturally-occurring amino acid. Amino acids can be referred to herein by either their commonly known three letter symbols or by the one-letter symbols recommended by the IUPAC-IUB Biochemical Nomenclature Commission.

As used herein, the terms "amplification" or "amplify" mean one or more methods known in the art for copying a target nucleic acid, e.g., biomarker mRNA, thereby increasing the number of copies of a selected nucleic acid sequence. Amplification may be exponential or linear. A target nucleic acid may be either DNA or RNA. The sequences amplified in this manner form an "amplicon." While the exemplary methods described hereinafter relate to amplification using the polymerase chain reaction (PCR), numerous other methods are known in the art for amplification of nucleic acids (e.g., isothermal methods, rolling circle methods, etc.). The skilled artisan will understand that these other methods may be used either in place of, or together with, PCR methods. See, e.g., Saiki, "Amplification of Genomic DNA" in PCR Protocols, Innis et al., Eds., Academic Press, San Diego, CA 1990, pp. 13-20; Wharam et al., *Nucleic Acids Res.,* 2001, 29(11):E54-E54; Hafner et al., *Biotechniques* 2001, 30(4): 852-6, 858, 860; Zhong et al., *Biotechniques,* 2001, 30(4): 852-6, 858, 860.

As used herein, the term "aggregation" or "cell aggregation" refers to a process whereby biomolecules, such as polypeptides, or cells stably associate with each other to form a multimeric, insoluble complex, which does not disassociate under physiological conditions unless a disaggregation step is performed.

As used herein, the terms "amphipathic" or "amphiphilic" are meant to refer to any material that is capable of polar and non-polar, or hydrophobic and hydrophilic, interactions. These amphipathic interactions can occur at the same time or in response to an external stimuli at different times. For example, when a specific material, coating, a linker, matrix or support, is said to be "amphipathic," it is meant that the coating can be hydrophobic or hydrophilic depending upon external variables, such as, e.g., temperature.

As used herein, the phrase "difference of the level" refers to differences in the quantity of a particular marker, such as a cell surface antigen, biomarker protein, nucleic acid, or a difference in the response of a particular cell type to a stimulus, e.g., a change in surface adhesion, in a sample as compared to a control or reference level. In illustrative embodiments, a "difference of a level" is a difference between the level of a marker present in a sample as compared to a control of at least about 1%, at least about 2%, at least about 3%, at least about 5%, at least about 10%, at least about 15%, at least about 20%, at least about 25%, at least about 30%, at least about 35%, at least about 40%, at least about 50%, at least about 60%, at least about 75%, at least about 80% or more.

As used herein, the terms "expression" or "gene expression" refer to the process of converting genetic information encoded in a gene into RNA, e.g., mRNA, rRNA, tRNA, or snRNA, through transcription of the gene, i.e., via the enzymatic action of an RNA polymerase, and for protein encoding genes, into protein through translation of mRNA. Gene expression can be regulated at many stages in the process. "Up-regulation" or "activation" refers to regulation that increases the production of gene expression products, i.e., RNA or protein, while "down-regulation" or "repression" or "knock-down" refers to regulation that decreases production. Molecules, e.g., transcription factors that are involved in up-regulation or down-regulation are often called "activators" and "repressors," respectively.

As used herein, the terms "extracellular matrix," "ECM," or "apical film" are used interchangeably, and encompass various liquid, gelatinous, semi-solid, or solid protein mixtures congruent with the complex extracellular environment found in many tissues. The extracellular matrix may be employed as a substrate for cell and tissue culture preparations or as a surface for cell adhesion to a liquid crystal matrix. The "extracellular matrix" may also include basement membrane extract and/or Engelbreth-Holm-Swarm (EHS) matrix.

As used herein, the term "epitope" means a protein determinant capable of specific binding to an antibody. Epitopes usually consist of chemically active surface groupings of molecules such as amino acids or sugar side chains and usually have specific three dimensional structural characteristics, as well as specific charge characteristics. Conformational and nonconformational epitopes are distinguished in that the binding to the former but not the latter is lost in the presence of denaturing solvents. In some embodiments, an "epitope" of a biomarker is a region in the biomarker protein to which the biomarker binding agent of the invention binds.

As used herein, the term "composition" refers to a product with specified ingredients in the specified amounts, as well as any product which results, directly or indirectly, from combination of the specified ingredients in the specified amounts.

As used herein, the terms "produce", "crops", "food component", "system component", "augmentation variable"- or "subject" refer to a plant, fungus, microbial colony, mammal, such as a human, but can also be another animal such as a domestic animal, e.g., a dog, cat, or the like, a farm animal, e.g., a cow, a sheep, a pig, a horse, or the like, or a laboratory animal, e.g., a monkey, a rat, a mouse, a rabbit, a guinea pig, or the like.

As used herein, the terms "matrix" or "support" or "hydrogel matrix" are used interchangeably, and encompass polymer and non-polymer based hydrogels, including, e.g., poly(hyaluronic acid), poly(sodium alginate), poly(ethylene glycol), diacrylate, chitosan, and poly(vinyl alcohol)-based hydrogels. "Hydrogel" or "gel" is also meant to refer to all other hydrogel compositions disclosed herein, including hydrogels that contain polymers, copolymers, terpolymer, and complexed polymer hydrogels, i.e., hydrogels that contain one, two, three, four or more monomeric or multimeric constituent units. Hydrogels are typically continuous networks of hydrophilic polymers that absorb water.

As used herein, the term "polymer" refers to a macromolecule made of repeating monomer or multimer units. Polymers of the present disclosure, include, but are not limited to, cellulose, laminarin, starch, chitin, chitosan, glucans, hemicellulose, poly(hyaluronic acid), poly(sodium alginate), poly(ethylene glycol) (PEG), poly(lactic acid) polymers, poly(glycolic acid) polymers, poly(lactide-co-glycolides) (PLGA), poly(urethanes), poly(siloxanes) or silicones, poly(ethylene), poly(vinyl pyrrolidone), poly(-hydroxy ethyl methacrylate), poly(N-vinyl pyrrolidone), poly(methyl methacrylate), poly(vinyl alcohol) (PVA), poly (acrylic acid), poly(vinyl acetate), polyacrylamide, poly (ethylene-co-vinyl acetate), poly(methacrylic acid), polylactic acid (PLA), polyglycolic acids (PGA), nylons, polyamides, polyanhydrides, poly(ethylene-co-vinyl alcohol) (EVOH), polycaprolactone, polyvinylhydroxide, poly (ethylene oxide) (PEO), and polyorthoesters or a co-polymer or terpolymer formed from at least two or three members of the groups, respectively.

As used herein, the term "reference level" refers to a level or measurement of a substance or variable which may be of interest for comparative purposes. In some embodiments, a reference level may be a specified moisture content as an average of the moisture content taken from a control subject/plant. In other embodiments, the reference level may be the level in the same subject/plant at a different time, e.g., a time course of administering or applying a particular composition or formulation.

As used herein, the terms "scaffold' or "substrate" or "supporting matrix", used in the context of a biomarker, etc., refers to any surface or structure capable of supporting a matrix, including compounds, formulations, markers, microbes, etc, grown therewith. Such supports or substrates have various contemplated surfaces, and/or are composed of materials, which include, but are not limited to, encapsulation materials, wax, glass, metal, plastic, and/or materials coated with polymers for coating, binding and/or immobilization of a one or more materials, e.g., poly(N-isopropylacrylamide) (PIPAAm), isopropylacrylamide butyl methacrylate copolymer (IBc), butyl methacrylate (BMA), poly-NIPAAm-co-AAc-co-tBAAm (IAtB), N,N-dimethylaminopropylacrylamide (DMAPAAm), poly(N-acryloylpiperidine)-cysteamine (pAP), PIPAAM-carboxymethyl dextran benzylamide sulfonate/sulfate (PIPAAm-CMDBS), or N,N-methylene-bis-acrylamide cross-linked polymer, PIPAAm-PEG, or any combinations thereof.

As used herein, the terms "treating" or "treatment" or "alleviation" refer to both therapeutic treatment and prophylactic or preventative measures, where the objective is to prevent or slow down (lessen) the targeted disease, condition or disorder. A subject/plant is successfully "treated" for a disorder if, after receiving therapeutic intervention/application according to the methods of the present invention, the subject/plant shows observable and/or measurable reduction in or absence of one or more targeted disease, condition or disorder. In illustrative embodiments, successful treatment results in disease control, insect control, nematode control, enhanced plant growth or performance, reduced susceptibility to abiotic stresses, improved nutrient uptake and enhanced photosynthetic efficiency.

As used herein, the terms "thermoresponsive material" or "thermoresponsive polymer" refer to a compound, material, monomer, polymer, co-polymer, terpolymer, or any combination thereof, that is capable of altering its state or property, i.e., hydrophobicity or hydrophilicity, in response to a change in temperature.

An "isolated" or "purified" polypeptide or peptide is substantially free of cellular material or other contaminating polypeptides from the cell or tissue source from which the agent is derived, or substantially free from chemical precursors or other chemicals when chemically synthesized. For example, an isolated aromatic-cationic peptide would be free of materials that would interfere with diagnostic or therapeutic uses of the agent. Such interfering materials may include enzymes, hormones and other proteinaceous and nonproteinaceous solutes.

As used herein, the terms "polypeptide", "peptide" and "protein" are used interchangeably herein to mean a polymer comprising two or more amino acids joined to each other by peptide bonds or modified peptide bonds, i.e., peptide isosteres. Polypeptide refers to both short chains, commonly referred to as peptides, glycopeptides or oligomers, and to longer chains, generally referred to as proteins. Polypeptides may contain amino acids other than the 20 gene-encoded amino acids. Polypeptides include amino acid sequences modified either by natural processes, such as post-translational processing, or by chemical modification techniques that are well known in the art.

As used herein, the term "simultaneous" therapeutic use refers to the administration of at least two active ingredients by the same route and at the same time or at substantially the same time.

As used herein, the term "separate" therapeutic use refers to an administration of at least two active ingredients at the same time or at substantially the same time by different routes.

As used herein, the term "sequential" therapeutic use refers to administration of at least two active ingredients at different times, the administration route being identical or different. More particularly, sequential use refers to the whole administration of one of the active ingredients before administration of the other or others commences. It is thus possible to administer one of the active ingredients over several minutes, hours, or days before administering the other active ingredient or ingredients. There is no simultaneous treatment in this case.

As used herein, the term "p-value" or "p" refers to a measure of probability that a difference between groups happened by chance. For example, a difference between two groups having a p-value of 0.01 (or p=0.01) means that there is a 1 in 100 chance the result occurred by chance. In illustrative embodiments, suitable p-values include, but are not limited to, 0.1, 0.05, 0.025, 0.02, 0.01, 0.005, 0.001, and 0.0001. In suitable embodiments, and throughout the Examples provided herein, letters of significance are at P=0.10 with the R studio interface.

Overview and General Description

The present invention relates to, inter alio, the discovery and development of a biological system of plant growth promotion by application of a highly effective strain of *T. viride*. In illustrative embodiments, "growth promotion," includes, but is not limited to, plant disease control, insect control, alleviation of abiotic stresses, improved nutrient uptake and/or improved photosynthetic efficiency. Nevertheless, this strain outperforms the best current strains of *Trichoderma* used for this purpose available commercially. It can be used in conventional or organic agriculture for the promotion of plant growth and increase in crop yields when applied topically as a foliar spray or as a seed coating. It consists of a biologically active strain of *Trichoderma viride.*

The highly active products also increase plant productivity and improve quality of fruits, vegetables, flowers or other plant products. Microbial agents applied as seed treatments or other methods of application have been shown to increase plant growth and development. In some embodiments, the most effective of these organisms colonize plant roots internally and induce beneficial changes in gene expression and that therefore give rise to changes in plant physiology. These alternations in plant physiology include coordinated up-regulation of entire biochemical pathways in plants. These changes comprise: reliable and consistent plant growth and yield promotion; enhanced root growth and development resulting in larger and deeper root systems; improved resistance to such abiotic stress including too little or too much water, salt and soil contamination; increased fertilizer use efficiency and especially nitrogen fertilizer use efficiency; and enhanced antioxidant levels in produce.

All of the effects noted above require energy, and can only occur if photosynthesis is enhanced. These microbial agents efficiently improve photosynthesis. Beneficial microorganisms with the capabilities described above, in some embodiments, have been and are used commercially. Previous product may entail mixtures of a fungus in the genus *Trichoderma* and a bacterium in the genus *Bacillus*, e.g., sold as QuickRoots™. An earlier version of Quick Roots in ABM trials did increase yields, but its performance was relatively inconsistent (ABM empirical data). This product does increase yields, but in numerous replicated trials it was relatively inconsistent (Advanced Biological Marketing unpublished empirical data). An improvement in consistency of performance was developed by Advanced Biological Marketing-, where the strains of *Trichoderma* spp. can be combined (different specific strain mixtures are present in the products sold for different crops), and have been sold under the tradename SabrEx™. These products give the advantage just enumerated above, in some embodiments, and provide consistent yield improvements of about 8.5 bushels of maize per acre. In some embodiments, other crops give comparable results and include soybeans, rice, cotton, vegetables, alfalfa and other forage legumes, and small grains including wheat.

The present invention, moreover, concerns the strain *Trichoderma* virens or *Trichoderma gamssii* NRRL B-50520, which was isolated from a chicken manure compost. It, along with two other fungi, was selected for their abilities to produce ammonia and amino acids from bird feathers because of its high levels of proteinase activity in certain embodiments. The ammonia and amino acids provide nitrogen to plants, while feathers themselves are broken down very slowly and do not provide immediate nutrients for plant growth. In other embodiments of the claimed invention, strain 50520 is exploited to release nutrients for plant growth.

In the present invention, we describe the use of this strain as plant growth promoting agent in suitable embodiments. It provides superior plant growth advantages when compared to the prior art, including SabrEx, which is probably the most effective commercially available product for plant growth promotion. The present inventors have discovered that, the primary mode of action of the claimed invention is via seed treatment, with other applications and embodiments demonstrating efficacy with respect to foliar applications on various plant sources, such as, e.g., wheat. Since it is effective as a seed and as a foliar treatment, there are various other embodiments and applications that are effective, such as, e.g., including: applications as an in-furrow granule; application as a soil drench where the organism will come into contact with roots and colonize roots; application as a root treatment, e.g, during transplant operations; and as a component of liquid or solid fertilizers. In many embodiments, the organism comes into contact with roots and establishes a beneficial relationship with the plant leading to plant growth promotion.

Likewise, the present invention is also highly effective in control of various deleterious organisms including plant pathogenic bacteria, fungi and nematodes. Nematodes contain structural proteins (collagens) in the outer surface and in eggs. In other work, *Trichoderma* strains with high levels of effective enzymes that degrade proteins such as keratin (in feathers) or collagen are effective in control of plant parasitic nematodes (Sharon, Bar-Eyal et al. 2001), includes eggs and the worms themselves. Thus, the present invention includes claims to control of both nematode and plant pathogenic microorganisms.

Beneficial microorganisms with the capabilities described above are used commercially. One such product is a mixture of a fungus in the genus *Trichoderma* and a bacterium in the genus *Bacillus*, and is sold as QuickRoots™ by Novozymes. This product does increase yields, but in numerous replicated trials it was relatively inconsistent (Advanced Biological Marketing unpublished data). The strains of *Trichoderma* spp. described herein and previously identified by ABM concern combined, i.e., different specific strain mixtures are present in such formulations for different crops, compositions for various uses. These products give the advantage just enumerated above, and provide consistent yield improvements of about 8.5 bushels of maize per acre. Other crops give comparable results and include soybeans, rice, cotton, vegetables, alfalfa and other forage legumes, and—small grains including wheat.

In accord with the foregoing, the present disclosure describes a strain of *Trichoderma gamsii* (NRRL B-50520) that has multiple capabilities for various uses in plant agriculture and development of systems for its use. The present disclosure, in illustrative embodiments, compares its abilities to enhance plant agriculture for a number of applications with a number of other microbial agents and that are contained within useful formulations. While other strains or mixtures have abilities to confer one trait or another, the strains and compositions of the present disclosure are uniquely versatile in functional capabilities. In some embodiments, the compositions of the present invention can be used in conventional or organic agriculture for the promotion of plant growth and increase in crop yields when applied topically as a foliar spray or as a seed coating. The highly active products also possess the ability to increase plant productivity and improve quality of fruits, vegetables, flowers or other plant products. The multifunctionality of the strains and compositions of the present disclosure, e.g., *Trichoderma gamsii* (NRRL B-50520), are demonstrated by a high level of activity in all of the cases noted below relative to other strains, and with respect to application as a seed treatment to increase: (i) plant growth and yield, (ii) plant root development, (iii) resistance to abiotic stress such as drought, salt and flooding, (iv) photosynthetic efficiency, especially under stress conditions.

Likewise, the benefits also include endpoints such as: (v) resulting in a reduction of foliar disease, (vi) controlling nematodes, with has particular abilities to inhibit reproduction (egg laying), thus preventing further development of the pest. This capability occurred not only where the organism was applied, but also in split roots where nematodes, but not the biocontrol organism, was applied, (vii) and, when applied as a seed treatment, it induces systemic changes in plant gene expression and results in season-long effects. Moreover, the compositions and strains of the present disclosure, (viii) remains localized in the root system and does not proliferate or spread to the above-ground parts of plants, including seeds used for food for humans or animals, while concomitantly, (ix) protecting planted seeds from soil-borne pathogens such as *Fusarium, Pythium* and *Rhizoctonia solani*. As a properly formulated organism topically applied to leaves of plants, the compositions and strains of the present disclosure, (x) controls populations of insects pests (white flies and aphids).

As such, the present invention concerns, in part, *Trichoderma gamsii* NRRL B-50520 (which was formerly classified as *T. viride*). See U.S. Pat. No. 9,249,061, which is hereby incorporated by reference in its entirety. Strain 50520 was isolated from a chicken manure compost. It, along with two other fungi, were selected for their abilities to produce ammonia and amino acids from bird feathers because of its high levels of proteinase activity. The ammonia and amino acids provide nitrogen to plants, while feathers themselves are broken down very slowly and do not provide immediate nutrients for plant growth.

In one aspect, the present invention relates to compositions and methods for employing the strains and compositions disclosed herein, e.g., *Trichoderma gamsii* NRRL B-50520, as plant growth promoting agents. In some embodiments, the strains and compositions disclosed herein, e.g., *Trichoderma gamsii* NRRL B-50520, provides plant growth advantages to commercial products currently available. The primary use of the strain and compositions disclosed herein, e.g., *Trichoderma gamsii* NRRL B-50520, is via seed treatment, but is also effective as a foliar application on wheat and other crops. Since it is effective as a seed and as a foliar treatment, a number of other applications prove efficacious as well including (i) as an in-furrow granule, (ii) as a soil drench where the organism will come into contact with roots and colonize roots, (iii) as a root treatment, e.g, during transplant operations, and (iv) as a component of liquid or solid fertilizers.

In all of the foregoing embodiments and applications, the organism, strain and/or compositions of the present disclosure come into contact with roots and establishes a beneficial relationship with the plant leading to plant growth promotion. Accordingly, in these embodiments, the organism, strain and/or compositions of the present disclosure is typically applied to plant systems in appropriate formulations, as further detailed here.

The mixtures contain ingredients that are eligible for organic listing. Ingredients that are safe and non-toxic, in some cases available for sale in commonly consumed foods. This will permit registrations with very short reentry and harvest intervals after application if the active ingredient also has appropriate characteristics. Is present in an emulsion that is stable both in the concentrated form and in dilutions used for field applications. Can be used either as a mixture acting as a defoliant or for direct killing of weeds.

The organic fertilizer described in U.S. patent application Ser. No. 14/360,520, which is incorporated by reference herein in its entirety, describes certain aspects of K5 and can provide a building block for continued developments of Omega, Omega with resistance inducing fungal and plant metabolites, K5, and for pest control that can form the basis for EPA and other agency-registration for pesticides.

EXAMPLES

The present invention is further illustrated by the following examples, which should not be construed as limiting in any way.

Example 1

Classification and Uniqueness of the Strain

Species identification of *Trichoderma* strain K5 (strain B-50520) was previously assigned by Dr. Stephen Peterson (USDA, personal communication). However, this species rarely occurs and many strains that were originally classified as *T. viride* have since been reclassified as *T. gamsii* (Jaklitsch et al 2006, Samuels 1996). It is ABM's contention that K5 should also be reclassified as *T. gamsii*. To support this claim we have sequenced the entire K5 genome using Next Generation Sequencing technologies (Illumina) and searched these data for the species indicator genes recognized by the International Subcommittee on *Trichoderma* and *Hypocrea Taxonomy* (ISTH) (Table 1). Sequences from both *T. viride* and *T. gamsii* were tested using the BLAST algorithm (Basic Local Alignment Search Tool, NCBI, Altschul et al 1990) along with several control species sequences (*atroviride, aureoviride*, and *citrinoviride*) (Table 2). As shown in Table 2, not all sequences tested against the K5 genome were found; however all *T. gamsii* sequences tested were present.

FIG. 1 shows the frequency and quality of the top BLAST results. It is notable that all *T. gamsii* sequences tested returned hits from a search of the K5 genome in addition to the fact that the vast majority of these hits were of high sequence identity. There is a clear differentiation between the ability of *T. gamsii* sequences to align to the K5 versus any other sequences tested. Taken together, these data support ABM's assertion that strain K5 (NRRL strain B-50520) is *T. gamsii* nd not *T. viride*, as previously indicated.

TABLE 1

Identifier genes used to search the K5 genome for data-informed assignment of species.

| Identifier Gene description | Gene symbol |
|---|---|
| Translation elongation factor alpha 1 | tef1 |
| Internal Transcribed Spacer, 5.8S 28S ribosomal RNA | ITS1 and 2 |
| RNA polymerase binding, exon | RPB2 |

TABLE 2

Number of gene sequences used to search K5 genome organized by species. Total number of sequences tested versus number that were actually found is shown. These numbers provide no information on the quality of the hit (sequence identity).

| | # Genes | |
|---|---|---|
| *Trichoderma* Species | Tested against K5 genome | Discovered in K5 genome |
| atroviride | 7 | 7 |
| aureoviride | 7 | 3 |
| citrinoviride | 4 | 2 |
| gamsii | 20 | 20 |
| viride | 13 | 11 |

These data clearly demonstrate that there is a high similarity to genetic sequences of *T. gamsii*, but that similarities to *T. viride* is much less. Thus, the conclusion is that NRRL B-50520 is properly classified as *T. gamsii*. Older methods of taxonomic valuations were unable to make these distinctions and, as indicated earlier it is now impossible to draw any conclusions as to species identities in the Sensibaugh application. Therefore, this data corroborates the conclusion that the mention of *T. viride* in the Sensibaugh application is impossible to relate to species or strains of *Trichoderma*.

Example 2

Figure 2:
FIG. 2 is a picture showing the appearance of corn plants in greenhouse trials.

*Trichoderma* Strain K5 Increases Growth in Maize, Wheat and Soybeans in the Greenhouse Corn trials in the greenhouse. Greenhouse trials showed that corn seeds treated with *T. virens* NRRL 50520 resulted in plants with improved growth and development. FIG. 2 shows corn plants grown from seeds treated with K5. The growth differences are clearly evident.

Figure 3:
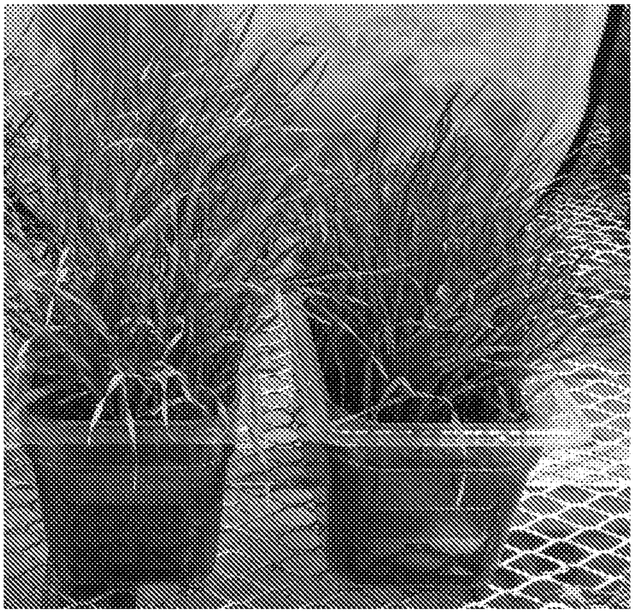
FIG. 3 is a picture showing greenhouse trials of foliar sprays on wheat seedlings. K5 at left and untreated (water only) on the right shows significant growth increase with foliar application of strain K5.

*Trichoderma* strain K5 increases growth in greenhouse grown wheat when applied as a foliar treatment. As shown in FIG. 3, the results of these treatments with the K5 sample (at left) being clearly larger and more vigorous that the control (wheat seedlings were planted into well drained containers in the greenhouse and treated with a foliar spray following emergence). Control plants were sprayed with water only. FIG. 3, moreover, shows the results of these treatments with the K5 sample (at left) being clearly larger and more vigorous that the control (at right).

Figure 4:
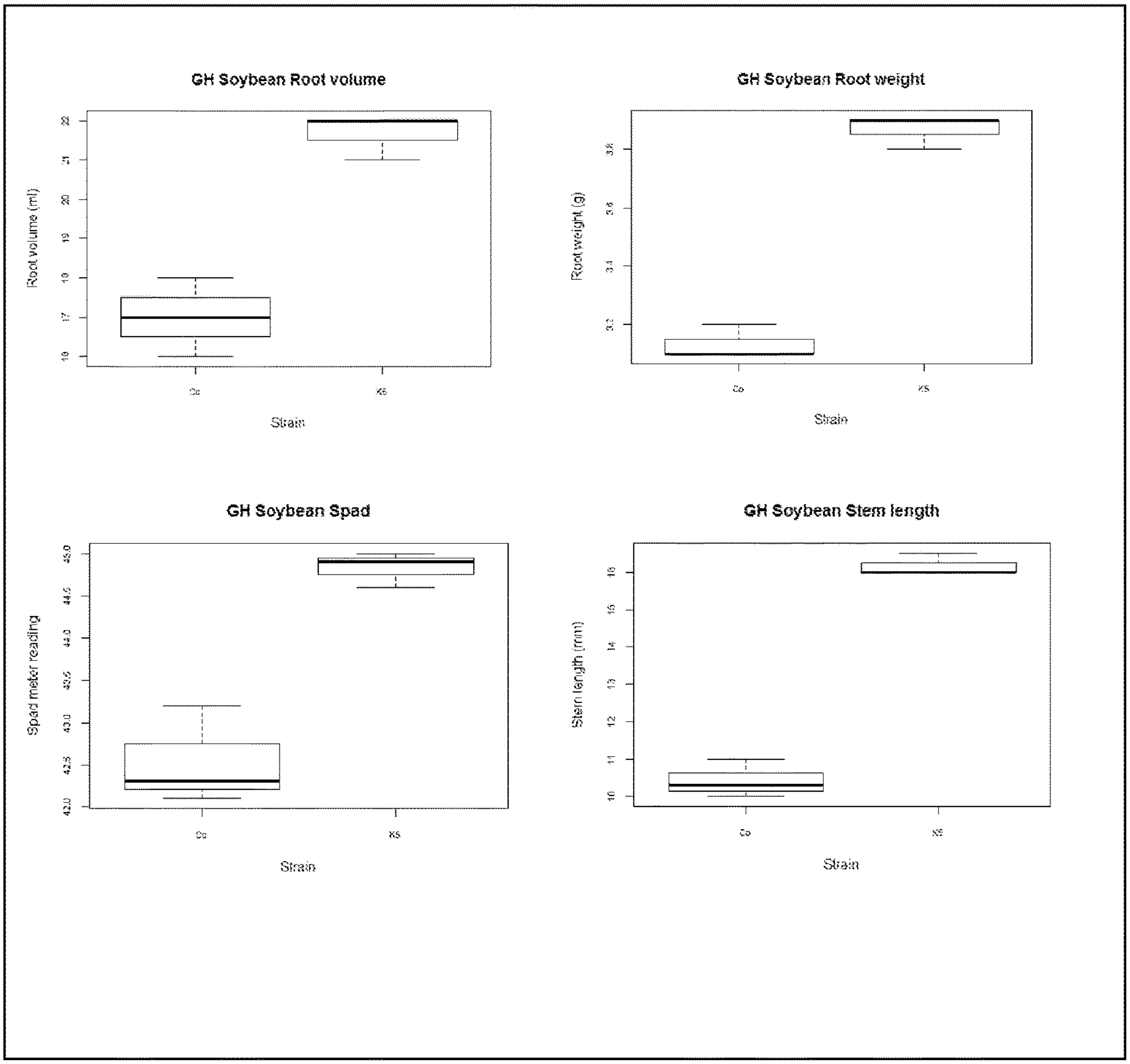
FIG. 4 shows a box and whisker plots showing mean differences and data distribution for characters root volume (p=0.0198), root weight (p=0.0082), spad (p=0.0375), and stem length (p=0.0057) for soybeans in the greenhouse having been seed treated with *Trichoderma* strain K5.

*Trichoderma* strain K5 increases growth in soybean in the greenhouse when applied as a seed treatment. Soybean seeds were treated with either *T. virens* NRRL B-5025 strain or left untreated with no other microbial or chemical treatments being applied. These were planted into sand tubes and growth data was collected as the seeds emerged and the seedlings grew. The *Trichoderma* treatment was found to significantly increase soybean seedling growth in these experiments as demonstrated in FIG. 4 showing stem length, Spad meter readings, root weight, and root volume. All of the differences shown in FIG. 4 are significant at alpha=0.05 or 0.01.

The data in this patent application clearly demonstrate that *T. viride* strain NRRL B-50250 enhances growth and productivity of both monocots and dicots, as demonstrated by tests on corn, soybean and wheat. On soybeans in the greenhouse, the stems were significantly larger than with control plants and the leaves had enhanced chlorophyll content as evidenced by SPAD meter reading (SPAD is product of the Minolta Corporation and measures leaf greenness, which is a direct measure of chlorophyll content). The data clearly show that this strain considerably enhances plant productivity more than the best strains that are commercially available.

Example 3

Enhancement of Corn Growth, Yield and Stress Resistance in the Field

Field Trials (ABM14 or 1st Field Trial). Yield, biomass, and other characters measured during the first field trial (ABM14) and second field trial (ABM15) of this example, growing seasons were analysed using the statistical analyses as described in Tables 3 and 5. ANOVA and Least Significant Difference (alpha=0.1) tests were performed on all data sets using the methods described in the Tables.

A field experiment was established on corn (*Zea mays*) near Phelps, NY (Baar Scientific, LLC) for ABM14 tests. Seeds of a transgenic, glyphosate-resistant commercial hybrid, A91-92R were obtained from Albert Lea Seeds, Albert Lea, MN The seeds were commercially treated with Acceleron™, a pesticide mixture containing ipconazole, metalaxyl, trifloxystrobin (fungicides) and clothianidin (insecticide). Seeds were overtreated with a liquid formulation mixture of K2 and K4, which is the commercial product SabrEx LQ, according to the manufacturer's directions. Other seeds were treated with a commercial blend of a humic acid product and minor nutrients, hereafter designated MJ, together with K2, K5+As2, or K2+As2. The fungal strains used were a liquid suspension of conidia at $8\times10^8$ cfu/ml, and the As2 concentration was $8\times10^9$ cfu/ml. The microbial suspensions were used to treat seeds at the rate of 0.9 ml/kg seed for each organism. This is the same *Trichoderma* seed treatment rate as is recommended with the SabrEx product. Preliminary experiments have demonstrated that all of the organisms used in the overtreatment are stable in the presence of the chemical pesticides (data not shown).

Plots were established on a sandy loam soil with moderate yield potential. These trials were conducted in a replicated block design with four replicates. Each treatment+replicate consisted of four rows 76 cm apart and 6 m long planted in a north-south orientation. Seeds were planted June 17 following a cool wet spring, silage harvest was September 15 and grain harvest on or about November 20. The first killing frost was in the last week of October. Weeds were controlled with glyphosate herbicide following the manufacturer's recommendations. Fertilization at the time of planting was with 46 kg of actual N/Ha in a 19:19:19 formulation. This was followed with a side dressing of 96 kg in mid-July as a surface broadcast application. All harvest for yield was from the middle two rows of each treatment replicate. For grain yield, the middle 4.6 m of the rows were harvested and for silage the northern 2.3 m was harvested. For root measurements and other destructive sampling, plants were dug or otherwise harvested from the outer rows away from areas that would be harvested for yield. Plant densities were not significantly different between treatments and was about 63,000 plants per Ha.

Plant height was measured twice during the season: just prior to tasseling and at harvest. Weights of silage and grain (yield) were collected after harvest, and the % nitrogen and carbon were assayed by a commercial service (A&L Laboratories or the Cornell Nutrient Analysis Laboratory).

Field trials were conducted again (ABM15) to account for any grain yields that were limited in the ABM14 trials by the performance limits of the variety used from the previous tests noted above. That is, increases in photosynthate apparently were converted to vegetative biomass more efficiently than to grain yield (Table 3). Therefore, in the second field trials five varieties of corn were tested as described by the supplier as determinate (2 varieties), semi-flex (2 varieties), and full flex (1 variety) ear types. These were provided by the Chemgro Company and are designated as 5469 RSX, 5018 G3 (determinate); 5245 RDP, 5455 RDP (semi-flex) and 6490 (full flex). All seeds used in the experiments were treated with an insecticide/fungicide mixture (Cruiser Maxx 250, Syngenta Crop Protection) that contains thiamethoxam, fludioxonil, mefenoxam, azoxystrobin, and thiabendazole.

Prior to planting, subsamples of each variety were treated with SabrEx LQ according to the manufacturer's directions. Other subsamples were treated with K2+K4+As2, K5+As2, or K2+As2 in combination with a mixture we have designated Omega™, containing 20 g of humate (Leondarite shale), 5 g of yeast extract, and 100 μl of 1-octen-3-ol (Sigma Chemical Co.) in 1 L of water, and adjusted to pH 6.2. Omega™ was also used alone as a separate treatment with no microbial agents. This mixture was applied at the rate of 0.65 ml/kg of seeds and was developed to provide a chemically defined replacement for the humate material used in the first trials. A low concentration of 1-octen-3-ol (mushroom alcohol), which is a volatile metabolite of *Trichoderma* strains, was included because it induces resistance to plant diseases as has also been reported by others (Morath, Hung, et al., 2012) and we have observed that it is a potent inducer of enhanced plant growth at very low concentrations.

This trial was located on a loamy clay soil near Waterloo, NY Plots were arranged by variety across the field as two rows 22.5 m long. Each treatment x variety was harvested for silage and grain. For this harvest, each set of rows was divided into four blocks each 1.8 m long for silage harvest interspersed with four blocks each 3.6 m long for grain harvest. The plots received 227,000 L of fresh manure incorporated before planting which resulted in application of about 155 Kg N/acre and another 150 K of N was applied as a liquid suspension side dress containing 32% N at about V4.

In addition, the area of the plots received intensive rain of more than 20 cm over a three week period just after emergence (the last week of May through the first two weeks of June). The plots were laid out such that for this entire 3 week period a portion of the field was either saturated or, through much of the time, completely submerged. This area of the field coincided almost exactly with that planted with 5245 RDP, and was relatively uniformly flooded. Thus, the trials with this variety afforded a good opportunity to examine the ability of the seed treatments to assist the corn in recovery from flooding stress. The remainder of the varieties were on higher ground and so were not subjected to this stress. Harvest and analyses of data were as described for the plots per ABM14.

Figure 5:
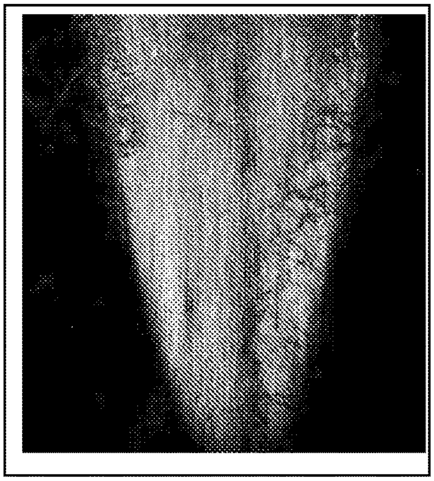
FIG. 5 shows photomicrographs of emerging radicles of corn from seeds treated with conidia of strain K1, stained with Calcofluor and visualized with epifluourescent microscopy. Without staining and illumination, roots with and without the organism appear identical. Appearance of radicle 48 hr after imbibition began, just after the radicle emerged from the seed coat (Left). The blue webbing is the organism; hyphae are about 4 μm wide. Gray tone image (used to enhance contrast) of a root 72 hr after imbibition. The growth of the organism is more pronounced and philiades are visible (arrow) (Right)).
Figure 5:
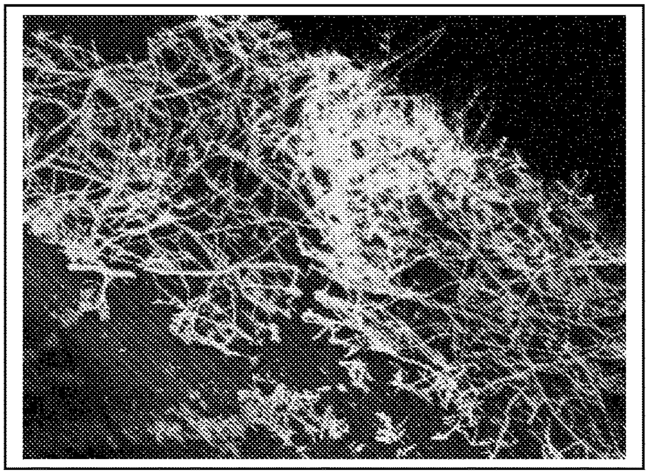

Microscopic Observations. Within 48 hr, the fungi had grown as hyphae onto the surfaces of the radicles and within 72 hr, had largely covered the surface of the radicles and produced phialides and conidia (FIG. 5). The observations shown are with strain K2, but all of the fungi used in this study had similar rapid germination of spores, growth of hyphae onto the surface of the radicle and rapid proliferation and completion of the life cycle.

Figure 6:
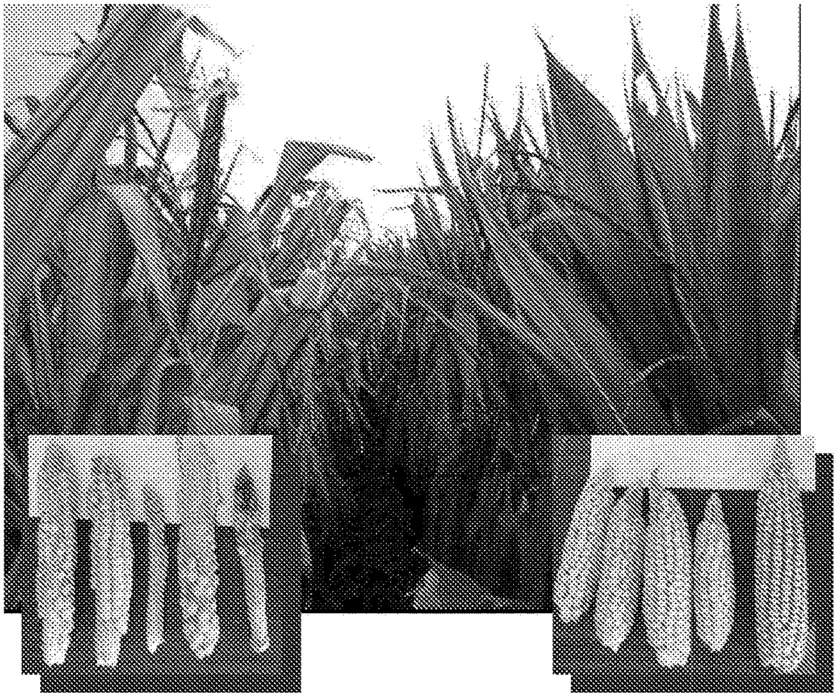
FIG. 6 shows the appearance of corn and ears from the corn in Illinois in the drought of 2012. Plants in the row on the left were grown with seeds treated with a commercial fungicide-insectide mix with the same fungicide mix plus SabrEx.
Figure 7:
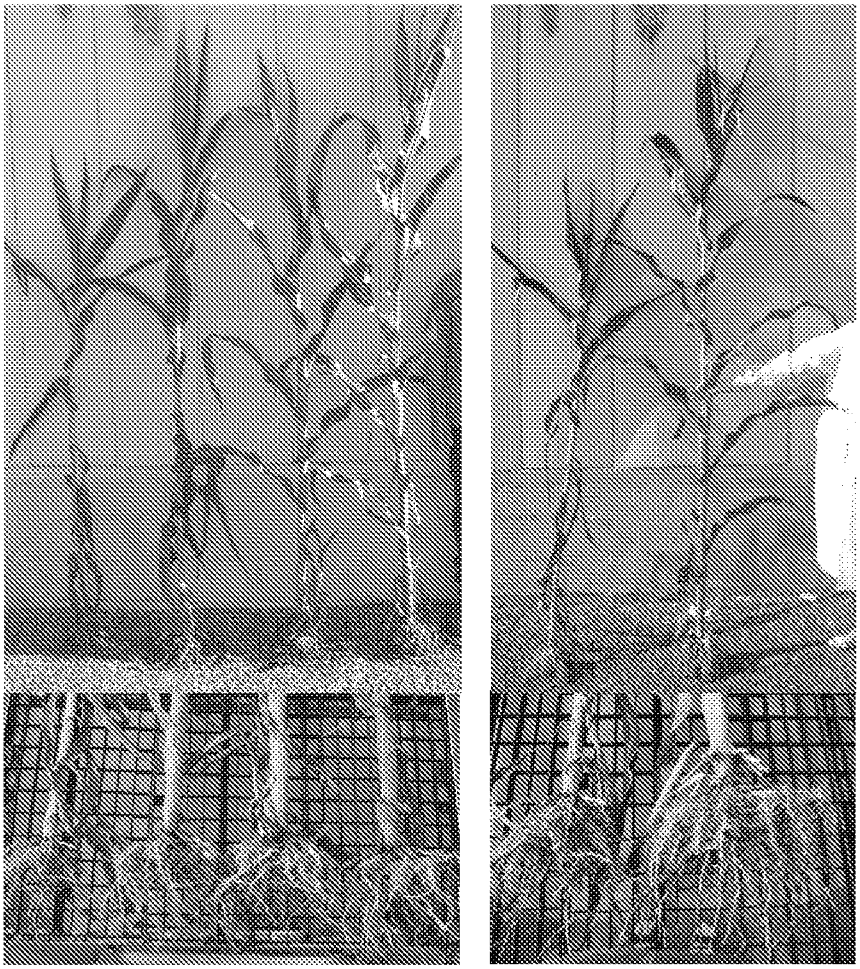
FIG. 7 is a picture showing the differences in plant shoot and growth with variety 6490 in field trials in ABM15. Panels A show appearance of plants and roots of the same plants following treatments with nothing (only the chemical seed treatment), and the same treatment with SabrEx, K2+K4 plus Omega, and K5As2+Omega. In B is shown the same control plant as compared with Omega alone. The largest plants were more than 270 cm tall.

Field Observations. In Illinois in 2012 there was a severe drought, with widespread crop failure. At this time, some seeds of corn were treated with SabrEx™ (strains K2 and K4). Differences in drought susceptibility were obvious in the mature crop, even though the plants were more 2 meters tall and the seeds were treated several months before the drought became acute. These differences were observed as plant survival, in ear growth, and grain filling. Especially prominent was the degree of browning and apparent leaf death between the treatments (FIG. 6). In the trials conducted per ABM15, however, there were pronounced differences in plant size of both shoots and roots (FIG. 7). Similar visible size differences were observed in the ABM14 field trials (data not shown).

Field Experiments ABM14. In Large differences in plant height were measured between treatments at mid-season; however, these differences vanished by harvest (Table 3). Modern corn plant height is a determinate character and at harvest plants heights were similar. However, the seed treatments resulted in more robust plants, as measured by stalk diameter, and plant weight, (Table 3)(FIG. 7). Roots were also much larger and more robust when the most effective strains are used as seed treatments. This increase in above-ground plant robustness resulted in an increase of more than 10 t/ha in total biomass (silage) at the time of harvest (just after the second plant height measurement), or just a little more than a 30% increase in plant biomass (silage). However, the grain yield increase was somewhat lower than the silage yield increase, about 24% (Table 3).

The most effective treatments were strain K5+As2 with MJ, K5 with MJ, and K2+MJ. These gave improvements in yield over the commercial product SabrEx (K2+K4). These seed treatment formulations also resulted in a reduction in northern corn leaf blight (causal agent *Exserohilum turcicum*), but corn rust (*Puccinia sorghi*) increased on the plants grown from the treated seeds. Based on the results with tomato (Supportive data/materials, (Mastouri, Bjorkman, et al., 2012)) we expected that there would be a net increase in photosynthesis in the corn trials. We therefore measured the total C content of the biomass that was harvested. We also expected an increase in nitrogen incorporated and so measured the total N in the biomass.

Field Results for ABM15. The results from ABM14 suggested that even if corn is more robust, not all of this is translated into grain yield. Thus, there might be a genetic component to grain yield that does not take full advantage of the increased plant growth and development. Commercial corn varieties differ in ear character: some are determinant, which means that a single ear of a certain size will be produced per stalk regardless of the amount of photosynthate that is available to the plant, others are semi-flex, which allows some increase in the size of ears depending on plant resources, while still others are full flex, which allows for plasticity in the size of ears, with larger ears depending on the photosynthate resources. Therefore, for the ABM15 field trials, we conducted trials on five different commercial corn hybrids that differed in this character (Table 5). The treatments also increased total N uptake in both ABM14 and ABM15; with 80 to 170 kg/h increases depending on variety and year.

During the early season wet period through mid-June all of the treatments with variety 5245 were in flooded conditions and grew to plant heights of less than 30 cm. After this point in the season, growing conditions improved markedly, and plants grown from seeds treated with the biological agents appeared to be much more robust and recovered from the flooding episode more fully than those without the biologicals. There was a substantial increase in growth by the end of July with plants treated with the microbial agents and a large increase in biomass (FIG. 7) which also translates to grain yield (Table 5). The seed treatments overall gave different results across varieties. In general, the SabrEx treatment gave the greatest response in biomass, but the greatest grain yield increase was with K5As2 (Table 5). The treatments also increased total N uptake in both ABM14 and ABM15; with 80 to 170 kg/h increases depending on variety and year.

Quite apart from the flood-stress interaction, there was a substantial difference in growth and development of the different varieties in reaction to the biological seed treatments. One variety, 6490, responded with a very large increase in biomass (87.5%). Other lines responded with lesser increases; in general, lines developed for grain as opposed to dual purposes gave lesser, and nonsignificant, increases in plant biomass but in both plant types, grain yields were similarly increased (Table 5).

Discussion and Microbial Strains and the Benefits Conferred. In our experience the efficacy and capabilities of microbial agents for plant agriculture is strain specific. We have been unable to generalize regarding the benefits at any species level criteria—just because one strain of *T. harzianum*, for example, is effective for a particular function is no indicator that another strain of the same species will be. In this work, we have tested and evaluated the function of two strains of *T. harzianum* (K2, K3), one strain of *T. atroviride* (K4), one strain of *T. gamsii* (K5), and one strain of *Bacillus amyloliquifaciens*, either singly or in combination. K2, K3 and K4, along with *T. virens* strain K1, are all components of commercial products that are in wide scale use on one crop or another while an earlier strain, T22, is widely and successfully used, especially in horticulture and greenhouse applications (Harman, 2000)(www.bioworksinc.com). However, as a seed treatment on corn, its performance was found to be inconsistent (Harman, 2006, Harman, Bjorkman, et al., 2008). For this reason, K2, K3, and K4 were developed and widely tested and used in the field. Further, for commercial applications, mixtures of strains (e.g., K2+K4 are ABM's SabrExLQ™ for corn) were produced for use with different crops, while K2 and K3 have been used for wheat seed treatments (SabrExLQ™ for wheat). Conversely, K1 is used for soybean treatments in combination with *Bradyrhizobium* strains (e.g. Excalibre™) but field testing of K1 indicates that this strain has negative impact on corn. The selection of these mixtures is largely empirical but is essential to successful use of these and similar organisms in commercial agriculture.

Per the present examples, examinations using confocal microscopy demonstrated that the strains have a remarkable ability to proliferate rapidly as seed treatments to the roots of developing corn seedlings. It is important to note that this rapid growth on the seeds, which must utilize plant resources to grow, occurs without any visible symptoms or inhibition of seedling growth. Indeed, as demonstrated using seeds of other plant species, seedling growth even at early stages usually is enhanced (Harman, Howell, et al., 2004, Lindsey and Baker, 1967). Thus, the plant growth enhancing abilities of these select strains must depend upon early establishment of the symbiotic fungus-plant relationship very rapidly upon seed germination (Mastouri, Bjorkman, et al., 2010). Certain metabolites of the fungi mimic this rapid effect upon plant growth, including 1-octen-3-ol as indicated herein. This rapid ability to colonize radicles emerging from corn, which is concurrent with expression of improvements in seed qualities and growth (Mastouri, Bjorkman, et al., 2010) may be a component of its abilities to improve corn growth and have affected its empirical selection as a reliable improver of seedling performance.

Some strains of *Trichoderma* clearly have evolved with plants and can be characterized as endophytic plant symbionts (Harman, Howell, et al., 2004), but most wild strains lack this capability. It is worthwhile to note that the total numbers of *Trichoderma* in typical field soils are up to 10,000 fold or higher than the levels added with the seed treatments in this paper, but these native strains are without observable effects on plant growth. Thus, while most soil-inhabiting strains have little effect on plant performance, addition of specific endophytic plant symbiotic strains can make a large difference. *Trichoderma* strains are not the only organisms that include strains that have qualitatively similar abilities to enhance plant performance. Fungi in the Sebicales, such as *Piriformaspora indica, mycorrhizae* and plant-growth promoting rhizobacteria all include at least some strains that can be considered as endophytic plant symbionts and all can increase plant growth and induce other changes within the plant that contribute to plant performance, such as resistance to diseases, resistance to abiotic plant stresses, and improved nitrogen use efficiency (Shoresh, Mastouri, et al., 2010). They also frequently are confined to roots but induce systemic changes in plant gene expression, which implies the production of triggering compounds. However, it highly improbable that these genetically very diverse groups of microorganisms express the same triggering molecules. For this reason, even if their qualitative effects are similar, their specific mechanisms are likely to differ. As an example, both *Bacillus* spp. and *Trichoderma* strains produce amphiphilic metabolites that are active at very low concentrations (less than 1 μmole), but they are chemically dissimilar. In *Bacillus* these include lipopeptides and production of the specific lipopeptide, surfactin, has been implicated in induction of systemic plant disease resistance in plants (Cawoy, Mariutto, et al., 2014). In *Trichoderma*, hydrophobic proteins probably have a similar role in inducing resistance and other plant responses.

The data reported herein indicates that we have succeeded in developing effective strain combinations and formulations. Greenhouse tests on tomato demonstrated the efficacy of each individual strain on parameters leading to improved photosynthetic efficiency and leaf greenness especially in the presence of water or salt stress (Supportive data/materials). In previous research, we demonstrated that the presence of strain T22 resulted in overexpression of a variety of genes and gene products involved in antioxidant cycling or direct degradation of ROS (Mastouri, Bjorkman, et al., 2010, Mastouri, Bjorkman, et al., 2012).

Enhanced Plant Performance. In both ABM14 and ABM15 studies, the largest grain yields were with treatments containing K5 or K5+As2, but in ABM15 silage yields were larger with SabrEx than with K5 combinations. The plant growth and yields were accompanied by marked increases in root growth as well. The combination of K2+K4+As2 was generally less effective than the other combinations, even though the same strains were present in this mixture. These combinations may be a detriment to performance, even though each strains performs well individually or as components of similar mixtures. It is possible that they compete through competitive signaling or other pathways. In ABM15 there were differences in the types of corn used. For increased grain yield, the best strain formulations were all effective but for increased total biomass, only the dual use varieties gave large increases in yield. In the best case (6490) the biomass was nearly doubled. This was accompanied by strong visual differences in plant growth, root development and stalk diameter (Table 3, FIG. 7).

Mechanisms of Action. The symbiotic capabilities at work in the current study are realized as the ability of root-contained fungi to establish chemical communication with the plant, and to propagate that signal systemically, inducing plant-wide changes. These systemic changes result in altered plant gene expression; (Shoresh, Gal-on, et al., 2006, Shoresh, Mastouri, et al., 2010). Hundreds of genes are up-regulated (Djonovic, Vargas, et al., 2007, Shoresh and Harman, 2008, Yedidia, Benhamou, et al., 2000) including coordinated up-regulation of entire pathways, rather than single gene or protein pattern expression enhancement. This results in plants that have (a) enhanced resistance to disease, (b) markedly enhanced resistance to abiotic stresses such as drought, salt, flooding and others, (c) bigger and deeper roots, (d) increased abilities to utilize nitrogen and other fertilizers, and (e) enhanced seed germination (Harman, Cadle-Davidson, et al., 2015, Mastouri, Bjorkman, et al., 2010, Shoresh, Mastouri, et al., 2010). This is shown diagrammatically in FIG. 4; all of these benefits are energy-intensive, and cannot occur without improved photosynthetic capability of the plant (Shoresh and Harman, 2008).

Figure 9:
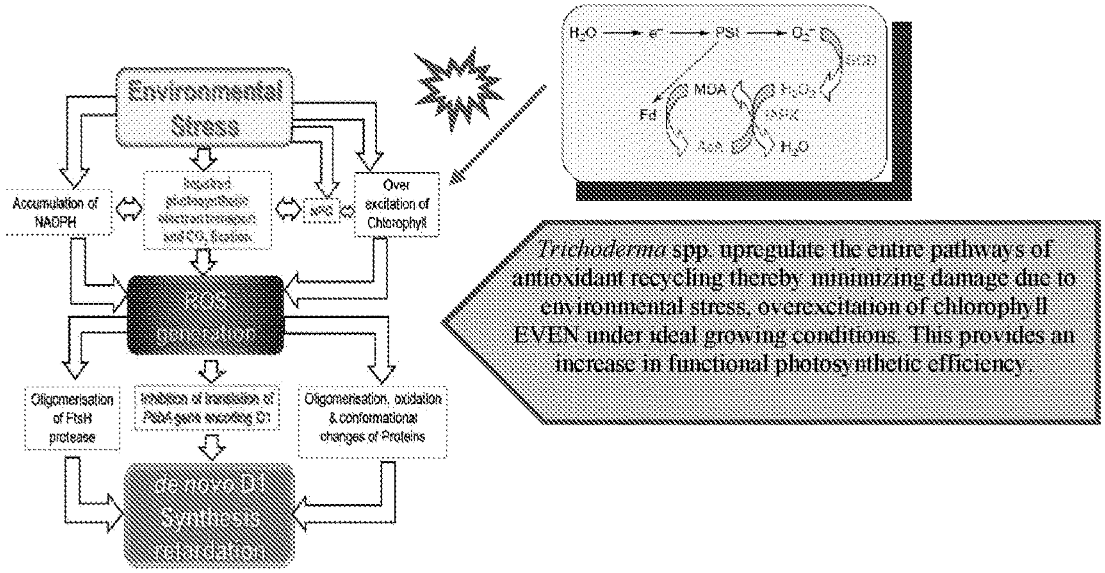
FIG. 9 is a diagrammatic representation of the ROS interactions in plants and the control of these negative compounds by OIRE induced by *Trichoderma* strains. The diagram on the upper right shows the overall path of ROS formation (Nath, Jajoo, et al., 2013) while the diagram at upper right shows the photoreactions involved in over excitation of chlorophyll by light from (Mittler, 2002).

The concepts underlying the induction of stress resistance in plants are unique. Plants suffer from over-accumulation of reactive oxygen species (ROS) as a consequence of stresses, such as drought, salt, temperature (Mastouri, Bjorkman, et al., 2010, Mastouri, Bjorkman, et al., 2012), or flooding, and as a by-product of over-excitation of photosynthetic systems. Thus, the internal environment of plants frequently contains an unfavorable redox balance. Among the pathways unregulated by our organisms are those that minimize accumulation of harmful ROS (Mastouri, Bjorkman, et al., 2012). We demonstrate that the presence of our organisms, plants gain an Optimized Internal Redox Environment (OIRE) through rapid antioxidant-mediated cycling of ROS to reduced forms thus allowing the plant to buffer itself against ROS-generating stresses (FIG. 9). In addition, several lines of evidence (Shoresh and Harman, 2008, Vargas, Crutcher, et al., 2010) indicate that the total photosynthetic machinery in plants is enhanced. Photosynthesis itself gives rise to ROS as a by-product of over-excitation of photosynthetic pigments.

The systems leading to stable OIRE appear to be inducible if both stress and the beneficial organisms are present (Supportive data/materials). The data suggest that induction is via a priming response as has been frequently described for induced resistance to pathogens (Goellner and Conrath, 2008). Priming is indicated since in the presence of both stress and the beneficial fungi, all of the parameters increased over either stress and in most cases markedly so, i.e, the response of the plants organisms in the absence of stress was less than when both stimuli were present (Supportive data/materials). This priming effect occurs systemically in plants, and is expressed as improved photosynthetic capability (Supportive data/materials) even though the organisms, at least the fungi, are restricted to the nonphotosynthetically roots.

Surprisingly, a formulation containing 1-octen-3-ol provided season-long improvements in growth and yield as well, even though the treatment included less than 1 μl of this metabolite/seed. These results strongly imply the chemical can itself induce relatively long-term changes in plant gene expression, perhaps through epigenetic means. The ability of these low concentrations to provide long-term plant benefits is consistent with the model shown in FIG. 8. Various chemical plant elicitors of plant disease resistance have been shown to induce chromatin modifications on defense genes normally found of active genes even though the genes themselves are not expressed. These changes result in histone modification patterns in the chromatin the allow the genes to be fully and rapidly expressed when proper stimuli are present (Jaskiewicz, Conrath, et al., 2011), resulting in reprogramming of plant gene expression (Waller, Achatz, et al., 2005). If this is the case with our systems, then the specific mode of action for the induction of scores of genes in the presence of our agents could be histone modification of plant chromatin. This could explain the apparent paradox of the presence of extremely low levels of compounds such as 1-octen-3-ol having effects upon plant performance for months after application. The abilities of these low levels of this metabolite are consistent with the concept of the action of the microbial agents acting via low levels of triggering microbial metabolites.

Overcoming Biotic and Abiotic Stress. The results of this paper also document improvements in tolerance or resistance to biotic stress or abiotic stress. In the ABM14 experiments, plants treated with the biological agents had lower levels of northern leaf blight, although leaf rust was enhanced. The resistance to leaf blight is almost surely due to induced systemic disease resistance, since it is a leaf pathogen and the biological agents are confined to the roots and/or seeds. Higher levels of N increases leaf rust incidence (Danial and Parlevliet, 1995); which may suggest enhanced nitrogen use efficiency may be related to incidence of the disease. The data from the examples herein demonstrate that stresses caused by flooding (Table 5) or drought (FIG. 6) were overcome in corn field trials. A wide variety of greenhouse data demonstrates that salt stress and even soil pollution stresses (Supportive data/materials)(Harman, 2011, Harman, 2011) can be overcome by application of our endophytic microbes or their metabolites as summarized in FIG. 8. All tables for this example (example 3; Tables 3-6) can be found at the end of the document).

Example 4

K5 and Other *Trichoderma* Strains Colonize Roots Rapidly when Applied as Seed Treatments, but do not Colonize Upper Parts of the Plants The past scientific literature demonstrates that endophytic *Trichoderma* strains are restricted to the cortical regions of roots even though they induce system-wide plant responses (see also Example 3; FIG. 7). For example, Yedida et al (Yedidia, Benhamou, et al., 1999) first demonstrated this phenomenon in tomato with a strain of *T. asperellum*. It was further demonstrated with *T. harzianum* strain 1295-22 on corn that roots grown from seeds treated with the organism were colonized heavily with the organism following seed treatment, but that stems were no not, and not different from those grown from the nontreated control (Harman, Petzoldt, et al., 2004).

Figure 10:
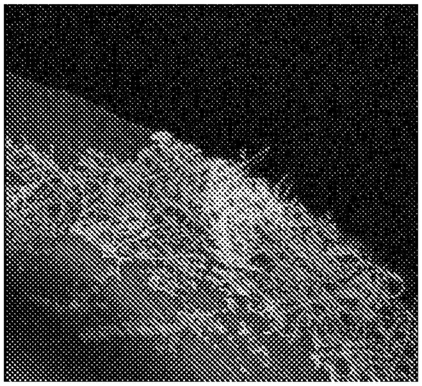
FIG. 10 shows the microscopic growth of K5 hyphae onto emerging radicle from seeds treated with this strain 72 hr after imbibition began.
Figure 11:
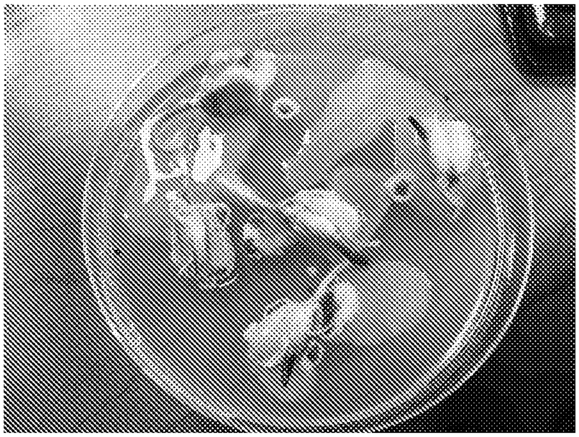
FIG. 11 shows a picture of Chemgro variety 5445, where the seeds were from plants grown with SabrEx-treated seeds after plating of the daughter seeds for four days on the PDA medium.

Example 2 above demonstrates the rapid growth of strain K2 onto roots from seeds treated with it; within 2-3 days after imbibition heavy colonization occurred. As part of the same experiments, K5 also was tested with the same result (FIG. 10). Thus, roots are heavily colonized. In Example 3, treatments that included K5 gave improved yields and stress resistance. However, in view of the discerned mechanism described in Example 3, FIG. 7, this this improvement in plant performance ought to occur in the absence of above-ground plant colonization. Therefore, seeds/grain produced from seeds treated with this and other similar strains ought to be free of the organism. To test this, 200 seeds produced from each of the varieties and treatments shown in Example 2, Tables were plated onto acidified potato dextrose agar (Difco) amended with Igepal co630, which is a surfactant. This medium permits enumeration of fungi on seeds and other plant parts but limits bacterial growth that can confuse results. Other experiments were done with potato dextrose agar alone (not acidication), which permits visualization of both fungi and bacterial. These media is routinely used in ABM labs to enumerate numbers of colonies of *Trichoderma* as part of the quality control process. If present, K5 or any of the other fungal strains that are part of the seeds shown in Example 3, grow rapidly and well, and easily diagnosed relative to other fungi or bacteria by their growth characteristics. An example is shown in FIG. 11, which shows seeds of Chemgro variety 5445. The seeds were from plants grown with SabrEx-treated seeds after plating of the daughter seeds for four days on the PDA medium. The seeds are all colonized by microorganisms; the bluish colonies are putatively identified as fungi in the genus *Penicillium* while the spreading mucoid growth is probably a *Bacillus* strain. These are all saprophytic organisms that have contaminated or colonized the seeds. However, *Trichoderma* strains were never seen, but are easily recognized, even those the planted seeds were heavily colonized (see FIG. 11 and Example 3). The *Trichoderma* strains were restricted to the roots even though they have significant and substantial effects on plant performance as described in Example 3.

Thus, in this experiment, 5 corn varieties×all of the seed treatments were compared, for a total of 4000 seeds. None of them gave rise to any *Trichoderma* colonies whatsoever, even though a variety of other saprophytic fungi (e.g. *Penicillum, Fusarium, Rhizopus* or *Mucor* tentatively identified by colony morphology) were readily detected. This demonstrates that the strains giving rise to the improved plant performance described in Example 3 were not transmitted to the seeds, and that the model provided in Example 3. FIG. 7) is correct. The fungal strains provide benefits to plants, colonize roots, but are not present on seeds.

Example 5

Nematode Control

Nematodes are roundworms that have a number of species that are parasitic/pathogenic on plants, usually on the roots.

There are 197 genera and 4300 species that are plant parasitic; all of these have a protrusible, hollow stylet, that they use to puncture and extract nutrition from plant roots.

Since they are primitive animals, typical chemical pesticides (e.g., fungicides and nematocides are ineffective). Since they live in soil, classical toxic chemicals are uneconomical and environmentally unfriendly since large amounts would have to be used to treat bulk soil, which has a weight of about 2 million kg/ha. Therefore, products with unique modes of action, for example, those which induce resistance in plants to the organisms and/or that are pathogenic to the worms have received increasing attention for a difficult problem in agriculture. For example, *Pasteuria nishizawae* is a mycelial and endospore forming bacterium that is parasitic on some species of plant damaging nematodes (Sayre, Wergin, et al., 1991) that has been commercialized by Syngenta for control of soybean cyst nematode as Clariva™. Similarly, *Bacillus fermis* strain 1-1582, the active ingredient of the soybean control product VOTiVO (Bayer) employs a biological mode of action with a unique bacteria strain that lives and grows with young roots, creating a living barrier that prevents nematodes from causing damage, according to the company website. A Michigan State study (2013 Seed Treatments for SCN by P. I. George W. Bird) indicates that the organism induces systemic resistance in the plants whose roots it colonizes. Both of these products are sold by the manufacturer in combination with chemical pesticides for control of soil-borne plant pathogenic fungi. In at least many states, damage by nematodes is increasing.

Since nematodes are a continuing and growing problem, more alternatives for control of these pests would be very useful. Strain K5 is a strong producer of proteolytic enzymes, and would be expected to produce quantities of chitinolytic enzymes, since this is a hallmark of *Trichoderma* strains. Strains with enhanced capabilities have been reported to have greater activity against these pests than the unaltered strains (Sharon, Bar-Eyal, et al., 2001). An ideal strain would: (i) be rhizospherically and endophytically competent and persist with the plant roots throughout the season, (ii) have strong nematocidal activity for an extended period of time in the field, (iii) be able to control plant pathogenic fungi that attack roots, thereby increasing its versatility as a biocontrol agent, (iv) would have ability to increase plant growth and yield apart from the capabilities in 1-3 above, and (v) would have ability to induce resistance to abiotic stresses. Strain K5 has all of these properties. Earlier examples have discussed capabilities in points 1, 4 and 5. This example addresses point 3.

Field Trial in Iowa. The present A trial in a field heavily infested with nematodes was established in Bancroft, Iowa. Treatments included were as follows: 1. Control untreated; 2. Liquid Excalibre (with *Bradyrhizobium*+*T. virens* strain K1)); 3. K5+MJ (a mixture of trace elements and plant growth stimulant; 4. K5+As2+MJ; and 5. K2+As2+MJ.

Throughout the season, treatment 3 had the largest and most vigorous plants. Yields were as follows in Chart A:

CHART A

| TREATMENT | REPLICATE YIELD (g) | MEAN YIELD (g) |
|---|---|---|
| Control | 555.5 | 626.9 b |
| | 653.6 | |
| | 671.6 | |
| K5 + MJ | 748.3 | 754.3 a |
| | 710.3 | |
| | 804.2 | |
| K5 + As2 + MJ | 678.5 | 589.4 bc |
| | 568.1 | |
| | 521.5 | |
| K2 + As2 + MJ | 645.3 | 587.7 bc |
| | 613.6 | |
| | 504.3 | |
| Excalibre LQ (K1 + *Bradyrhizobium*) | 491.3 | 476.6 c |
| | 538.9 | |

The present Mean yield values followed by dissimilar letters are significant at P=0.05 (ANOVA LSD). These data indicate that K5 gave excellent performance, and that inclusion of As2 (*Bacillus amyloliquifaciens* strain) made performance worse. The Excalibre formulation, at least numerically, gave the poorest yields.

Figure 12:
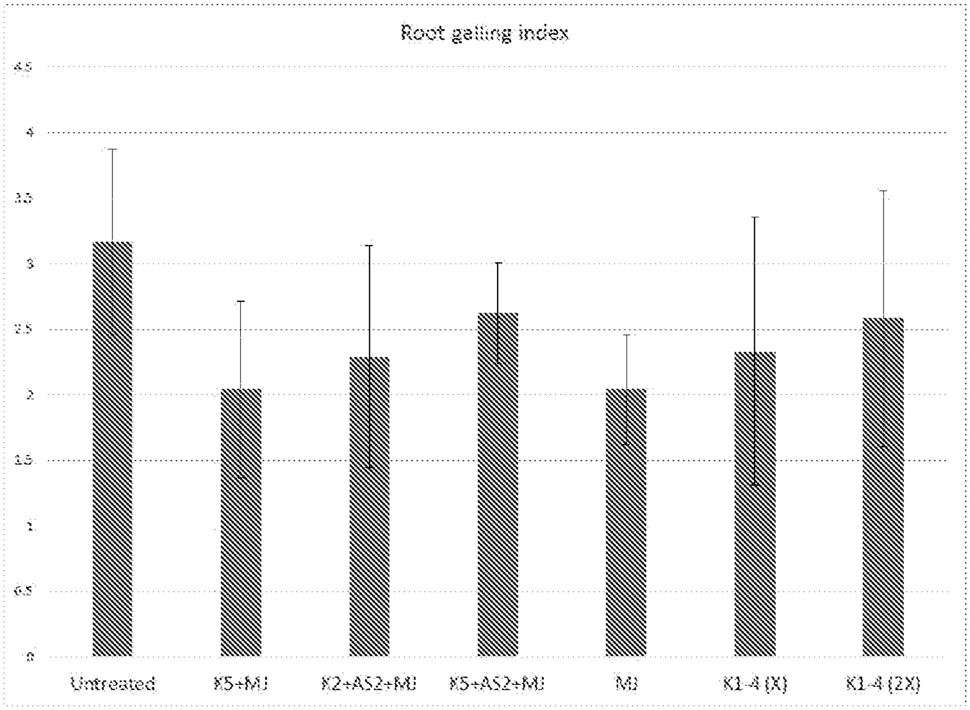
FIG. 12 is a graph showing sunflower seed data where the seeds were treated with various microorganisms and planted into soil infested with plant parasitic nematodes. After the plants were mature, roots were harvested and rated for root galling caused by the nematodes.

Field trials with sunflowers in the field in South Africa. Trials were conducted in the Republic of South Africa. Sunflower seeds were treated with various microorganisms and planted into soil infested with plant parasitic nematodes. After the plants were mature, roots were harvested and rated for root galling caused by the nematodes. Results are shown in FIG. 12. The variability was quite large in this naturally infested field. However, the lowest numerical galling index of the biological treatments was with seeds treated with K5, and K5+As2, as in the previous example gave poorer results. Treatments with K1-K4 also gave numerically poorer results. However, application of MJ itself gave results similar to those of K5+MJ. These results are consistent with those in the previous subexample.

Comprehensive evaluation of the strains in greenhouse trials. The previous subexamples were suggestive but results were not conclusive. It is difficult to obtain statistically valid results directly on nematode control from natural infestations since the levels of nematodes differ widely on a microsite level. Therefore, controlled greenhouse tests were conducted with Nemlab, a company in South Africa who specializes in nematode control testing.

This trial was designed to consider mechanisms as well as direct contact control. As noted earlier, induction of systemic resistance was considered highly desirable, and would be expected given the generalized mechanisms of action described in Example 3, FIG. 8. To assess this character, tomato plants were grown for 6 weeks and then the roots were split into two, and each half root was placed into a separate pot with a single shoot. Except for water controls, 500-1000 eggs of the root knot nematode, *Meloidgyne javanica* were placed into each root system, but only one side, the various treatments were placed the biocontrol agents at 108 cfu/g soil. So, one root system of each plant contained nematodes only while the other contained nematodes plus the treatments. The treatments are shown below; there were six replicates per treatment. In addition to the treatments shown below in Table 3, there was another control possessing single roots to which nematodes were not added.

TABLE 3

| Treatments | Pot 1 (of split root system) | Pot 2 (of split root system) |
|---|---|---|
| 1. Control | *M. javanica* (positive | No *M. javanica* (negative |
| 2. *Trichoderma* K1 | *M. javanica* | *M. javanica* + K1 |
| 3. *Trichoderma* K2 | *M. javanica* | *M. javanica* + K2 |
| 4. *Trichoderma* K3 | *M. javanica* | *M. javanica* + K3 |
| 5. *Trichoderma* K4 | *M. javanica* | *M. javanica* + K4 |
| 6. *Trichoderma* K5 | *M. javanica* | *M. javanica* + K5 |
| 7. K1, K2, K3 + K4 | *M. javanica* | *M. javanica* + K1 + K2 + K3 + |
| 8. K1, K2, K3 + K4 + | *M. javanica* | *M. javanica* + K1 + K2 + K3 + K4 |
| 9. *Bacillus* AS2 | *M. javanica* | *M. javanica* + AS2 |
| 10. K5 + AS2 | *M. javanica* | *M. javanica* + K5 + AS2 |
| 11. K2 + K4 | *M. javanica* | *M. javanica* + K2 + K4 |
| 12. K2 + K3 | *M. javanica* | *M. javanica* + K2 + K3 |

The experiment was designed to evaluate the ability of each strain to directly control (pot 2) and to control at-a-distance, the nematodes. Control of the nematode populations or their plant damage in pot 1 would be strongly suggestive of systemic resistance. There were a number of evaluations made of the plants at the end of the experiment, and the most important are shown below in Table 4 (Galling Index).

| Treatments | Pot 1—nem. alone (of split root system) | Pot 2—agent + nematode (of split root system) |
|---|---|---|
| 1. Control | 3.16 ab (positive control) | 0 f (negative control) |
| 2. *Trichoderma* K1 | 3.33 a | 3.17 ab |
| 3. *Trichoderma* K2 | 3.33 a | 2.67 bc |
| 4. *Trichoderma* K3 | 2.33 cd | 2.67 bc |
| 5. *Trichoderma* K4 | 2.33 cd | 2.5 cd |
| 6. *Trichoderma* K5 | 1.3 e | 2.17 cd |
| 7. K1, K2, K3 + K4 | 2.8 cd | 2.3 cd |
| 8. K1, K2, K3 + K4 + K5 | 2.5 cd | 2.5 d |
| 9. *Bacillus* AS2 | 2.3 cd | 2.0 d |
| 10. K5 + AS2 | 2.17 cd | 2.7 bc |
| 11. K2 + K4 | 2.3 cd | 2.33 cd |
| 12. K2 + K3 | 2.33 cd | 2.0 d |

Root galling is an index of the formation of 'knots' on roots that give root knot nematode its name and is an index of the root damage. The galls are the areas where the nematode is infesting the root and laying its eggs. The scale=0, no galls, 1, visible galling, 2, 25% of roots with galls, 3, 50% of roots with galls, 4, 75%, and 5, 100%.

TABLE 5

| Numbers of female nematodes/root | | |
|---|---|---|
| Treatments | Pot 1—nem. alone (of split root system) | Pot 2—agent + nematode (of split root system) |
| 1. Control | 9.67 def (positive control) | 0 f (negative control) |
| 2. *Trichoderma* K1 | 25.17 abc | 35.7 a |
| 3. *Trichoderma* K2 | 12.17 cdef | 8.0 def |
| 4. *Trichoderma* K3 | 9.67 def | 12.33 def |
| 5. *Trichoderma* K4 | 8.67 def | 8.50 def |
| 6. *Trichoderma* K5 | 4.0 ef | 8.5 def |
| 7. K1, K2, K3 + K4 | 13.8 cdef | 14.1 cde |
| 8. K1, K2, K3 + K4 + | 9.67 def | 11.0 def |
| 9. *Bacillus* AS2 | 14.67 bcde | 8.16 def |
| 10. K5 + AS2 | 21 bcd | 28.5 ab |
| 11. K2 + K4 | 28.3 ab | 28.3 ab |
| 12. K2 + K3 | 19.67 bcd | 9.67 def |

TABLE 6

| Number of Eggs/Root System | | |
|---|---|---|
| Treatments | Pot 1—nem. alone (of split root system) | Pot 2—agent + nematode (of split root system) |
| | 47636 a (positive control) | 83 d (Negative control) |
| 2. *Trichoderma* K1 | 45631 a | 48765 a |
| 3. *Trichoderma* K2 | 97333 cd | 14721 bc |
| 4. *Trichoderma* K3 | 7430 cd | 22450 b |
| 5. *Trichoderma* K4 | 3515 cd | 2756 cd |
| 6. *Trichoderma* K5 | 1298 d | 493 d |
| 7. K1, K2, K3 + K4 | 2630 cd | 1587 d |
| 8. K1, K2, K3 + K4 + | 2730 cd | 600 d |
| 9. *Bacillus* AS2 | 2481 cd | 970 d |
| 10. K5 + AS2 | 5128 cd | 3743 cd |
| 11. K2 + K4 | 3040 cd | 3082 cd |
| 12. K2 + K3 | 533 d | 502 d |

These data indicate that several of the treatments had strong effects in nematode control and survival. The level of galling was reduced by about 60%, numbers of female nematodes by about the same amount, and the numbers of eggs by about 99% in the most effective treatments. The substantial difference in % between numbers of female nematodes and eggs strongly suggests that, even though the nematodes were able to survive, they were unable to lay eggs, which will dramatically reduce the numbers of the pests in succeeding generations. Thus, while direct damage as evidenced by galling and reduction in numbers of the pests, the greatest effect was on egg laying and therefore nematode fertility.

While several strains and strain combinations were effective, overall the most effective treatment was K5. Other mixes had nearly as good an effect, especially As2 and K2+K3. In most cases, combinations of strains were less effective than single strains. In some specific examples, the combinations of 4 or 5 strains was significantly less effective than some of the single strains used alone, even though the single strains were in the mixture. One possible explanation can be inferred from Example 3, FIG. 8—each individual strain has different mixtures of eliciting/triggering molecules, and the combination of strains may provide contrary signaling to the plants.

Figure 8:
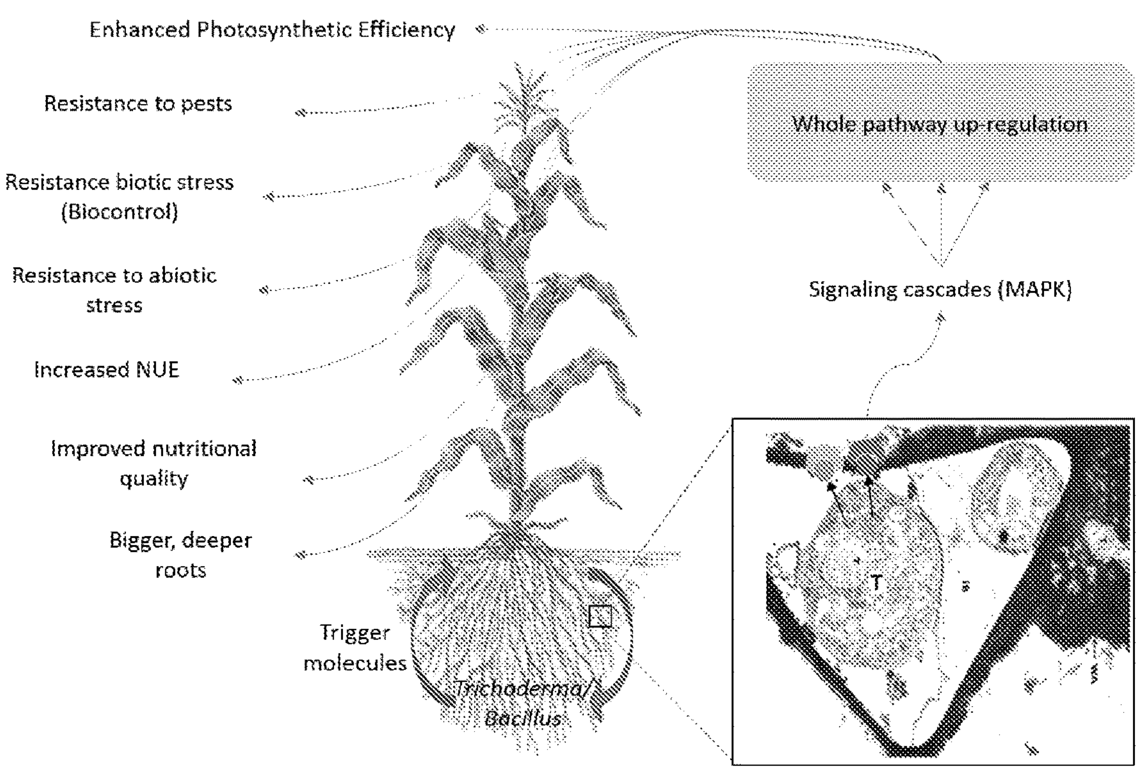
FIG. 8 is a diagrammatic representation of the interactions between endophytic *Trichoderma* strains and plants. The fungi (represented by the box and the term beneficial microbes) colonize the roots, and are restricted to the cortical cells. The electron micrograph in the lower right corner are from another endophytic microorganism, a strain of *T. asperellum* and is from (Yedidia, Benhamou, et al., 1999). The structures labeled T are hyphae of the microorganism in the root cells. The presence of the fungus induces cell wall deposition and prevents the infection of the organism throughout the plant (Yedidia, Benhamou, et al., 1999) but the strains used in this study continue to proliferate in the plant and, as shown, induce season-long effects (Harman, Howell, et al., 2004, Shoresh, Mastouri, et al., 2010). These fungi produce a variety of metabolites that can mimic the effect of the organisms and these are hypothesized to bind to receptors in the plant cells; the metabolites are indicated by the yellow symbols and green symbols represent plant receptors. One such metabolite is 1-octen-3-ol As a consequence, plants respond with numerous changes in plant gene expression (Djonovic, Pozo, et al., 2006, Marra, Ambrosino, et al., 2006, Mastouri, Bjorkman, et al., 2012, Shoresh and Harman, 2008). This, results in substantial changes in plant physiology and performance, including increased biomass of both shoots and roots (data in this paper and elsewhere), enhanced photosynthetic efficiency (this paper), resistance to diseases (Djonovic, Pozo, et al., 2006, Shoresh, Mastouri, et al., 2010), resistance to abiotic stresses such as drought, salt (Mastouri, Bjorkman, et al., 2012), and flooding (this paper), increased nitrogen use efficiency (Harman and Mastouri, 2010) and this paper, and enhanced antioxidant levels in produce (Harman, unpublished).

Moreover, the hypothesis of systemic induced resistance as indicated in Example 3, FIG. 8, was confirmed. In all effective cases, the nematode-only root half resulted in similar effects to the nematode+agent root half. The only possible way for this to occur, since the agents are not in contact with the nematode only roots was through physiological changes induced by the presence of the pest and the agent together. An alternative explanation could be that the nematode-only root halves were contaminated by the agents over the course the experiment. This alternative seems unlikely since if contamination was the cause, then the nematodes should also have increased and this either did not occur or, in the case of egg counts, was extremely small.

Example 6

Disease Control

The abilities of K5 and other strains to control disease was assessed—Foliar disease control with agents applied as seed treatments. The different strains and mixtures to control foliar diseases were observed even if the organisms were applied as seed treatments. Since at least the *Trichoderma* strains do not colonize above ground plant parts, the control observed occurred at a distance from the physical location of the disease symptoms. Such capabilities have been observed with other strains (Harman, Howell, et al., 2004, Harman, Petzoldt, et al., 2004), but are an important contribution to the overall capabilities of K5 and the other products described in this patent. These results are presented in tabular form in Example 3. These data show that a natural infection of the pathogen was lessened by the biological treatments, with mixtures containing K5 being the most effective. All of the seeds including the control had a base fungicide:insecticide treatment as described in Example 3.

Figure 13:
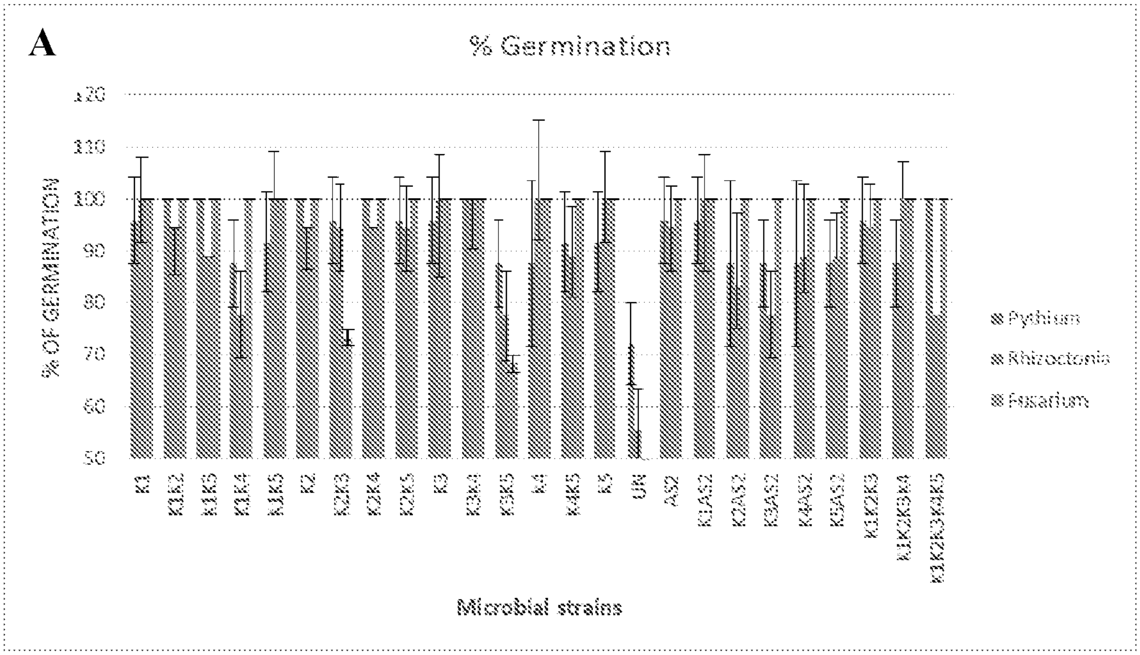
FIGS. 13A-C are graphs showing results from tests with *Pythium* and *Rhizoctonia solani* we planted soybean seeds and for *Fusarium* spp., we used *Fusarium gramincola* with wheat as the test system (Harman, Taylor, et al., 1989). Data are shown in FIG. 13 for the various pathogens. Values of means are shown and error bars represent standard deviations. Each graph shows the combined data for % seed germination, shoot growth, and root volume for all three pathogens.
Figure 13:
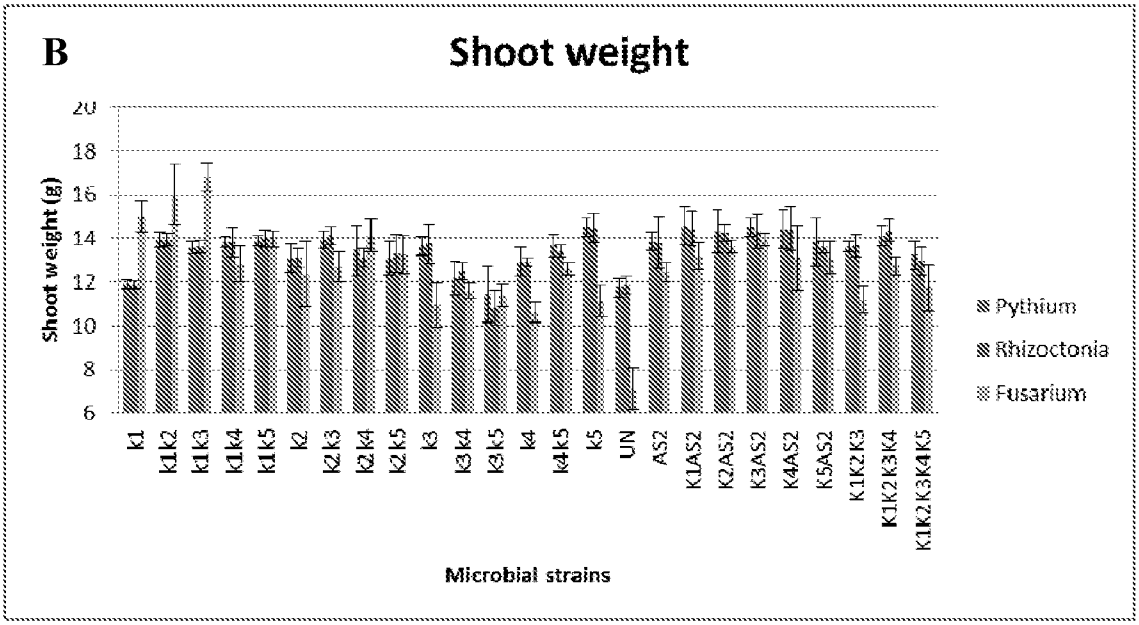
Figure 13:
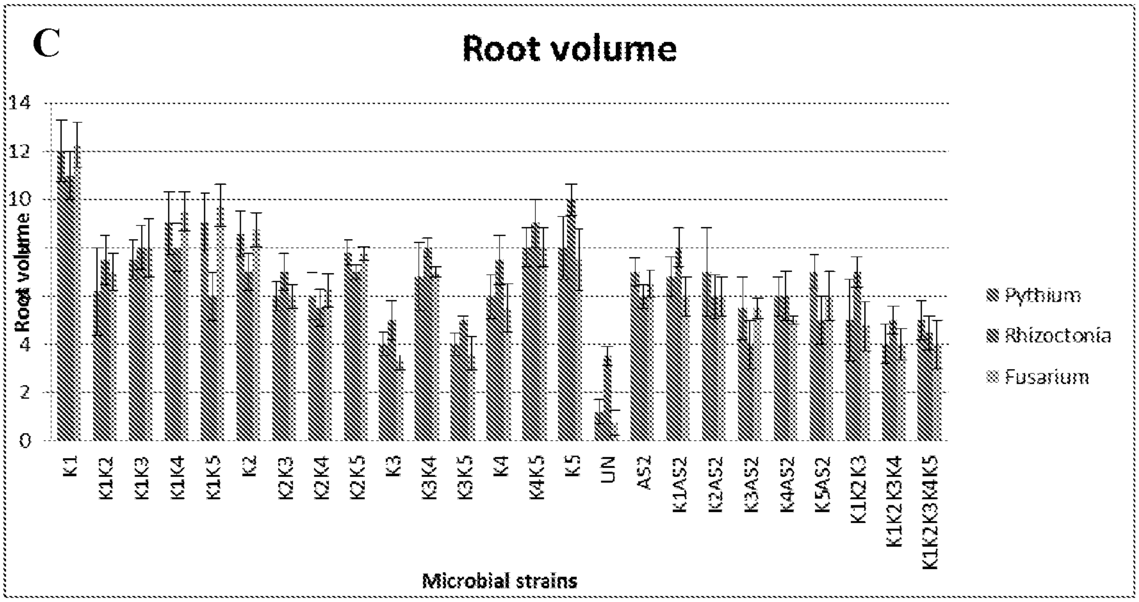

Control of soil-borne diseases using seed treatments. An important attribute of biological seed treatments is their abilities to control a range of soil-borne pathogens. Among the most important are the Oomycetes, especially *Pythium* spp. which rot seeds and cause root rots; *Rhizoctonia solani*, which is unrelated to *Pythium* spp., and are *Basidomyceteous fungi*, and *Fusarium* spp. which again are unrelated to the other two, and are *Ascomyceteous* fungi. The first two pathogens infect a wide range of host plants, but *Fusarium* spp. are relatively specific, with particular species/biotypes being relatively specific to particular plants (Chupp and Sherf, 1960). In this example, we used methods previously published (Harman, Taylor, et al., 1989). Soils were infested with the various pathogens at levels that would give about 60% kill of seeds or plants in the soil. For tests with *Pythium* and *Rhizoctonia solani* we planted soybean seeds and for *Fusarium* spp., we used *Fusarium gramincola* with wheat as the test system (Harman, Taylor, et al., 1989). Data are shown in FIG. 13A-C for the various pathogens. Values of means are shown and error bars represent standard deviations. Each graph shows the combined data for % seed germination, shoot growth, and root volume for all three pathogens. Since soybeans were the test crops for *Pythium* and *Rhizoctonia*, and wheat was used in tests with *Fusarium*, the data is indicative of the capabilities of the strains to protect seedlings against diverse Oomycete and fungal pathogens and that similar capabilities occur on a dicot (soybeans) and with a monocot (wheat). See FIG. 13A-C.

These data demonstrate that all of the strains have abilities to control all three pathogens and prevent seed germination losses. See FIG. 13A-C. Moreover, protection of the plant after germination is demonstrated by enhanced shoot growth, and more importantly, as root volume. All three pathogens are serious root pathogens, and damage of root zones prevents adequate plant growth. It is important to note that chemical seed treatment chemical fungicides frequently do not control root rots since their activity is restricted to the seed itself. As noted in earlier examples, these microbial agents have systemic activity and therefore protect plants and roots for much longer periods of time than do the chemicals. An important observation is that complex mixtures of strains, e.g., K1 through K4 or K5, do not perform as well as single strains, especially K1 and K5 (see especially the root volume data), a phenomenon also noted with the nematode control data. See FIG. 13A-C.

Example 7

Control of Foliar Insect Pests

It is imperative that plants be protected for diseases caused by various insects and mites, fungi, Oomycetes, and bacteria to avoid unacceptable losses. There are a wide variety of synthetic chemicals used for this purpose. However, in many cases, plant pests have developed resistance to these, especially those that have specific mechanisms and that are the safest to use. Further, regulatory agencies around the world are tightening restrictions on synthetic pesticides; for example, the EU recently banned a large group of insecticides that have been very widely used. *See The Guardian* "Bee-harming pesticides banned in Europe: EU member states vote ushers in continent-wide suspension of neonicotinoid pesticides," Published Apr. 29, 2013. For these reasons, plus a very high cost of discovery and regulation, there are now very few new potential chemistries being developed as commercial agricultural pesticides.

Further, some users prefer, and may insist upon, products that can be certified as organic. There are a few of these in the marketplace such as MilStop, a product based on sodium or potassium bicarbonate, and various water-miscible oils such as Sylet Oil and Neem oil. Beyond this, are a number of naturally occurring microorganisms, and their metabolites, that result in biocontrol of pests and in improvements in plant growth and productivity. This invention is directed toward development of a natural organic pesticide(s) that possess (i) abilities to suppress or control both plant diseases and insect pests of plants, (ii) increase plant growth and productivity, and (iii) accomplish these benefits in a cost-effective manner. As such, this example is directed towards production of novel new and effective nontoxic natural pesticides with abilities to control a wide range of pests.

As noted earlier, there are a few products that are available commercially that function as natural, nontoxic pesticides. Some of these include the bicarbonate and oil based materials described above. There are also plant extracts, including Neem Oil, Safer's Soaps, which contain salts of fatty acids as the active ingredients, and also including extracts of *Reynoutria sachalinensi*. Neem oil is effective against insects, and the extracts of *R. sachalinensi* are registered for control of a range of fungal, Oomycete and a few bacterial pests. Several microbial-based products are also available, for the most part with bacteria in the genus *Bacillus* as the active ingredient. As such, this aspect is directed towards development of novel pesticidal products with strong, long-lasting activity against a variety of pests. In this family of inventions are novel combinations of highly active microbial metabolites combined synergistically with oil-based compositions.

In the examples presented earlier, the applications were primarily as seed treatments, and contained formulants that enhance activity/ease of use of the products. For foliar applications, formulants also are necessary. We have developed a formulant composition designed specifically for use on plant surfaces. Chemical pesticides all are formulated to enhance their activity but this necessity has been little addressed in the development of biological agents, but this is remedied in this application. Requirements for a formulant need various criteria for success; these are enumerated as follows (i) the formulation needs to contain surfactants to allow them to adhere to the waxy leaf surfaces of plants, (ii) the formulant needs to be designed as a concentrate, so that large volumes do not have to be shipped and transported, (iii) the formulant needs to be water miscible, so that when it is diluted with water it forms a stable emulsion or solution so that the ingredients do not separate while being applied, and (iv) ideally, the formulant would itself be of value in pest control or other attributes to which the effects of any microbial agents would be additive or synergistic.

The goal has been achieved. A mixture containing the following simple ingredients, all of which can be obtained as organically registrable forms is shown below. The mixture, designated Organic Pesticide Base (OPB), follows (any mixture containing multiples of this basic mixture is appropriate): 20 ml soybean oil (other vegetable oils can be substituted), 20 ml deionized water, 0.5 g soy lecithin (other vegetable lecithins can be substituted, and 6 ml EcoSilWet (other similar surfactant can be substituted. This material is a concentrate and is typically diluted to 3-10 ml/L of water for field application. Biological agents are stable in the diluted mixture, and so the expectation, and practice in the trials that follow, is that concentrated suspensions of microbial agents would be mixed with the diluted OPB within a few hours of application.

Figure 14:
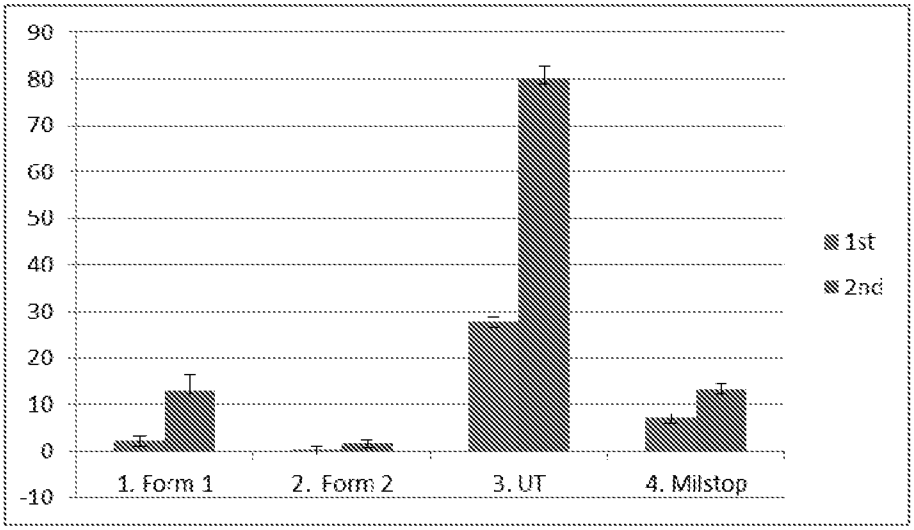
FIG. 14 is a graph showing powdery mildew rating (% leaf area covered, y-axis) after various treatments. The error bars represent the standard error (three replicates of one plant each).

Activity of OPB alone—Control of powdery mildew. Squash plants (Cucurbita pepo 'Sweet Dumpling') were grown in the greenhouse and, when they were at the first true leaf stage, they were placed near larger plants that were heavily infected with powdery mildew (*Podosphaera xanthii* (previously known as *Sphaerotheca fuliginea* and *S. fusca*) and/or *Erysiphe cichoracearum*. Under conditions of growth, which were favorable to the pathogen, an epiphytotic occurred and untreated plants were rapidly covered by the pathogen, sometimes resulting in plant death. Thus, in these trials, the disease progressed rapidly and ratings at weekly intervals show the progression of the disease. Plants were sprayed to runoff with the test materials described with each individual experiment on a weekly basis. The untreated control was sprayed only with water. The sprays for the blue bars labeled 1st were after a single spray, and those orange bars labeled 2nd were after two sprays. The areas of leaves covered with powdery mildew were estimated 7 days after sprays, and the formulation 1 was applied at 3 ml/L while formulation 2 was applied at 6 ml/L (Table 12). The two products have roughly the same level of soybean oil and EcoSilwet, but the inclusion of the sodium stearate necessitated a greater water inclusion to maintain a liquid product. Results are shown in FIG. 14.

In these experiments, the epiphytotic of powdery mildew was developing rapidly; the untreated control value demonstrates that most of the leaf areas of these plants was fully covered by sporulating disease. Both Milstop and the two formulations reduced disease, and the best results were obtained the base formulation described above with the inclusion of the soap sodium stearate. Formulation 1 is the base formulation. With these treatments, the level of mildew was almost zero in these experiments. These data demonstrate that OPB is superior to the commercial organic product (Milstop).

Control of aphids. Plants of kale (Brassica oleracea 'Nagoya Blanc') were grown in the greenhouse and an infestation of green peach aphids (*Myzus persicae*) was established. When plants had 6-8 leaves, they were treated with either formulation 1 or 2, or else with the commercially available product organic product Stylet Oil™, which has 97.1% paraffin oil as its active ingredient. The Stylet Oil™ label states that the oil used "is a superior grade technical mineral oil subjected to sufficient refinement steps to remove the impurities found in typical spray oils." It was mixed with water according to the manufacturer's directions at 10 ml/L. Formulation 1 or 2 was mixed with water at the rate of 6 ml/L. As a control, plants were sprayed with water only. Several experiments were conducted; representative data are shown below. Six single plants were used as replicates and treatments were contained within screen cages, thus preventing the spread of aphids between treatments and replicates. Table 7 is shown below, where all data evaluated for mean separation within individual columns using P=0.1. In parentheses are the fold change from the pretreatment count numbers.

TABLE 7

(trial 1)

| TREATMENT | RATE | Green Peach aphids per plant PRE Count December 7 | Green Peach aphids per plant 3DAT December 10 | Green Peach aphids per plant 7DAT December 14 |
|---|---|---|---|---|
| Formulation 1 | 6 mls/liter | 49.83 a | 61.67 bc (123%) | 91.7 b (184%) |
| Formulation 2 | 6 mls/liter | 48.33 a | 36.17 c (74.5%) | 75.6 b (156%) |
| Stylet Oil | 10 mls/liter (1.0%) | 51.17 a | 83.83 b (163%) | 112.7 b (220%) |
| Untreated control | | 64.83 a | 123.00 a (189%) | 219.3 a (338%) |

TABLE 8

(trial 2)

| TREATMENT | RATE | Green Peach aphids per plant PRE Count January 4 | Green Peach aphids per plant 4DAT January 8 | Green Peach aphids per plant 7DAT January 11 |
|---|---|---|---|---|
| Form. 1 | 6 mls/liter | 135.7 a | 25.7 b | 21.3 b |
| Form. 2 | 6 mls/liter | 167.2 a | 44.8 b | 28.3 b |
| Stylet Oil | 10 mls/liter (1.0%) | 201.8 a | 64.8 b | 44 b |
| Untreated control | | 165.3 a | 121.2 a | 104 a |

The in trial/experiment 1, the number in parentheses reflect the percentage increase in aphid numbers relative to the pretreatment counts. These data consistently showed that both of the formulations described in this example, as well as Sylet Oil, reduced the rate of increase of aphids (Trial 1) as well as the number of aphids on treated plants (both Trial 1 and 2). The difference between the two trials is that in Trial 1, the aphid populations were expanding rapidly, but in the more mature culture in Trial 2 the aphid populations were no longer increasing. In general, both the rate of increase and the absolute final numbers were less with either of the two formulations than with the established product, Stylet Oil. There was a high level of variability in these experiments, so in most cases the differences were not significant at P=0.1, but the trends in all experiments were consistent.

Beyond this, the ratio of formulation or product to water was less with the two formulations than with Stylet Oil, demonstrating that, on a volume:volume relationship, the two formulations were more effective than Stylet Oil. Beyond this, even though Stylet Oil is registered for organic use, it is not a natural product (it is based on petroleum oil) while our formulations are more than 85% natural plant products. This data generally indicates that our products are superior to other organic products on the marketplace.

Figure 15:
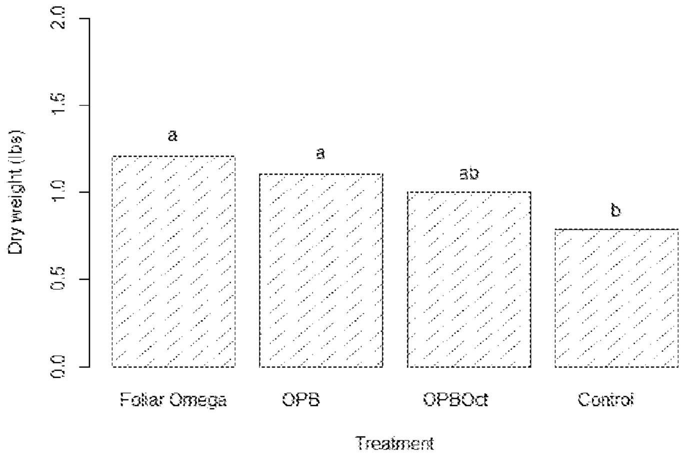
FIGS. 15A-B show graphs, where OPB and a control (water) were sprayed onto alfalfa plants in a commercial field at the rate of 6 ml/L and two weeks later, 12 sq. ft. portions were harvested (three replicates). In addition, 1-octen-3-ol was applied as well, as was a mixture of OPB+1-octen-3-ol and plant nutrients plus a humic acid product.
Figure 15:
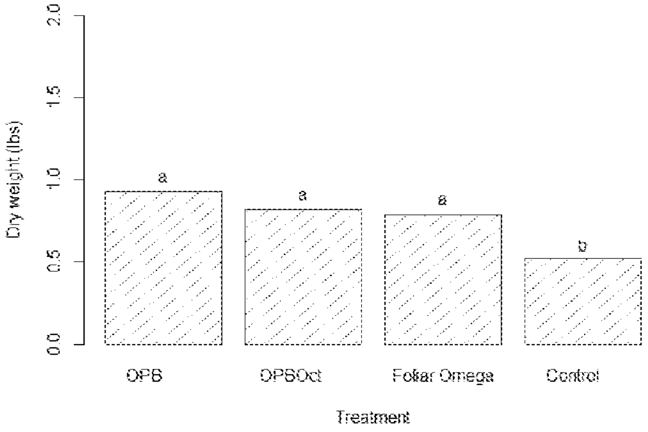

Enhanced yield of alfalfa. OPB and a control (water) were sprayed onto alfalfa plants in a commercial field at the rate of 6 ml/L and two weeks later, 12 sq. ft. portions were harvested (three replicates). In addition, 1-octen-3-ol was applied as well, as was a mixture of OPB+1-octen-3-ol and plant nutrients plus a humic acid product. The results are shown in FIGS. 15A-B. The same plants were allowed to regrow for about 4 weeks after harvest and again harvested with results shown below. These results demonstrate that OPB or OPB plus other nonliving ingredients resulted in enhanced plant growth for an extended period of time. OPB is in itself a useful agricultural product that results in (i) control of powdery mildew, (ii) control of aphids, (iii) enhanced plant growth, and (iv) in addition, it forms a stable dilutable emulsion that can be used to deliver microbial agents.

Control of white flies with OPB+microbial strains. Experimental plants: greenhouse grown tomatoes. Pest: White flies, (Bremia spp.). Protocol: Tomato plants were infested with white flies and kept in insect-proof cages to prevent transfer of insects to other plants and between treatments.

Plants that were heavily infested were sprayed with water (control) or with microbial agents in the OPB (organic pesticide base) adjuvant. For preparations containing bacteria, a suspension of 1-2×$10^8$ colony forming units were prepared, and 3 ml of this suspension was added per liter of spray suspension. For *Trichoderma* strains, a suspension of 1-2×$10^8$ cfu/ml was used. Three ml of the OBP formulation were used in each spray. OPB contains 20 ml organic soybean oil, 20 ml deionized water, 0.5 g soy lecithin, and 6 ml EcoSilwet (Momentive). Plants were sprayed a single time and then populations of the pest were monitored over time by counting white flies on plants on a weekly basis. At zero time, there were about 150 white flies per plant.

Organisms tested were *Trichoderma* virens strain 41 (ABM K1), *T. viride* strain NRRL 50521 (K5) and *Bacillus* strains (species follow in parentheses, those without designations are *amyloliqifaciens*) PH2 (*pumilus*), HHB (*licheniformis*), TRH13 (*Paenibacillus lentimorbus/alvei/popilliae* group), PHI (*pumilus*), AL1, AS1, TR4 (*thuringensis/cereus*)*lanthracis* group, BCS, AS3, AS2, HHHB1, TRH10 (*thuringensis/cereus*)/*anthracis* group) and BC3 *thuringensis/cereus*)/*anthracis* group). These are all naturally occurring strains isolated near Geneva, NY that were associated with plants or plant products. The first letter designates source, with P indicated potato tubers freshly dug from soil, HH indicating hickory nut hulls that fell onto the forest floor, TR indicating tomato roots, BC designating hardwood bark compost, AS and AL designating alfalfa stems and leaves, respectively.

Figure 16:
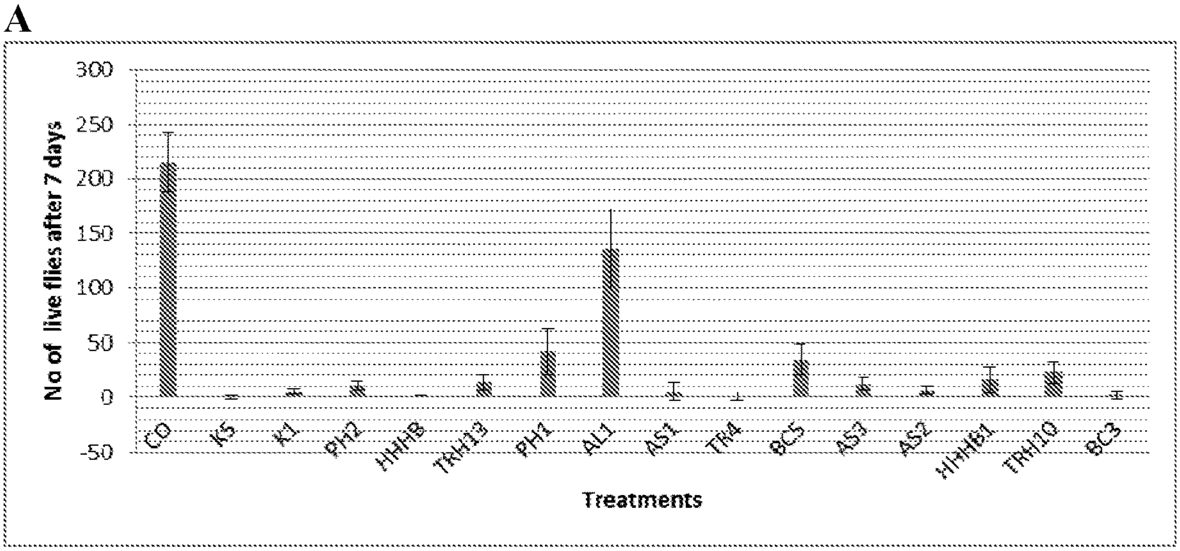
FIGS. 16A-B show data for controlling white files.
Figure 16:
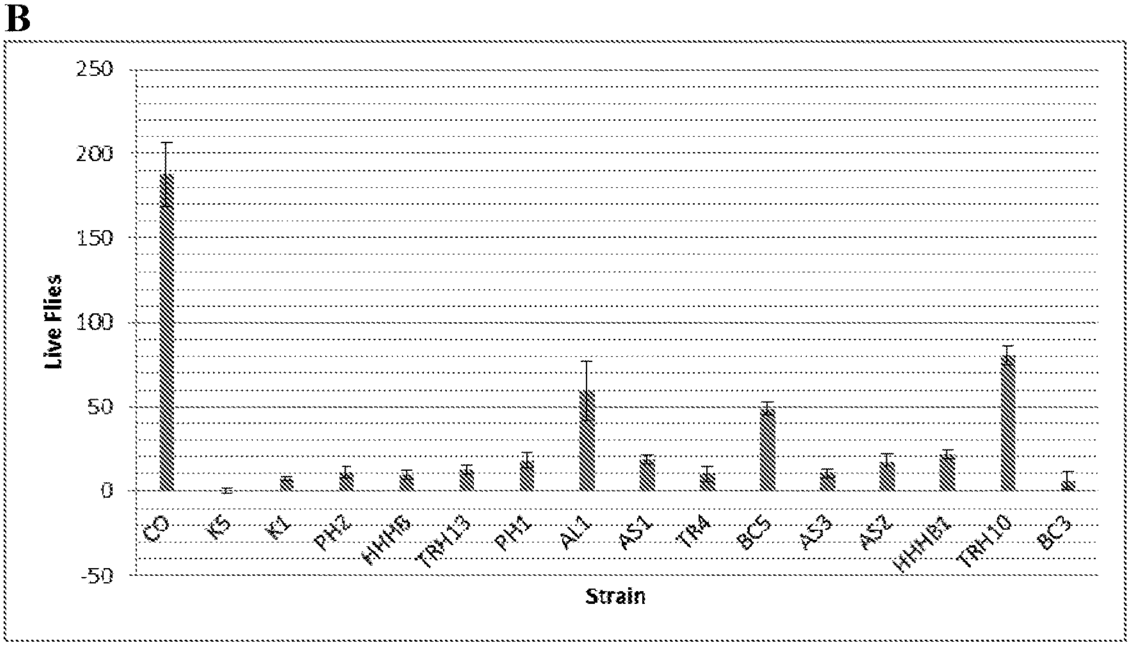

Results show that in a few cases, spraying the microbial spore preparations resulted in immediate lethality to the white flies. These were BC3, AS3, PH1, and TRH13. One week after spraying, the following result was obtained (CO indicates water control). The strains had been previously been screened and so most of the strains appeared to have efficacy, but one strain (AL1) was included because preliminary results indicated it was not very effective. The control obtained was presumed to be a consequence of direct toxicity of the strains, or some component of the mixture containing the microbe, was toxic. The differences between the strain list that provided immediate lethality vs the results at one week are likely due either to a slow-acting toxin (the endotoxins from *B. thurinigensis* have this attribute for example). There is also a possibility that some of the organisms could infect and cause illness in the insects. See FIG. 16A-B.

Figure 17:
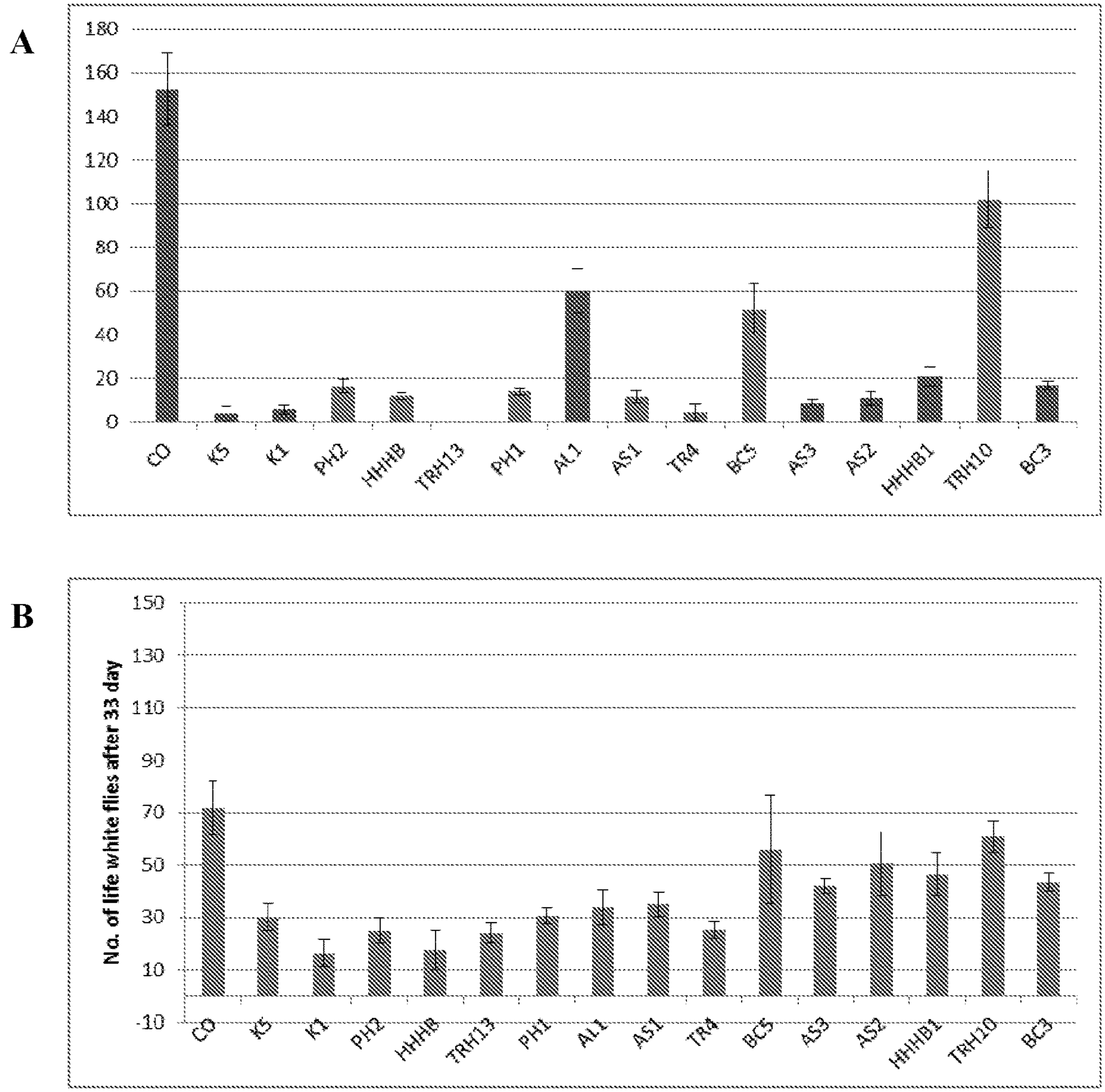
FIGS. 17A-B show replicate data sets for controlling white files.
Figure 17:
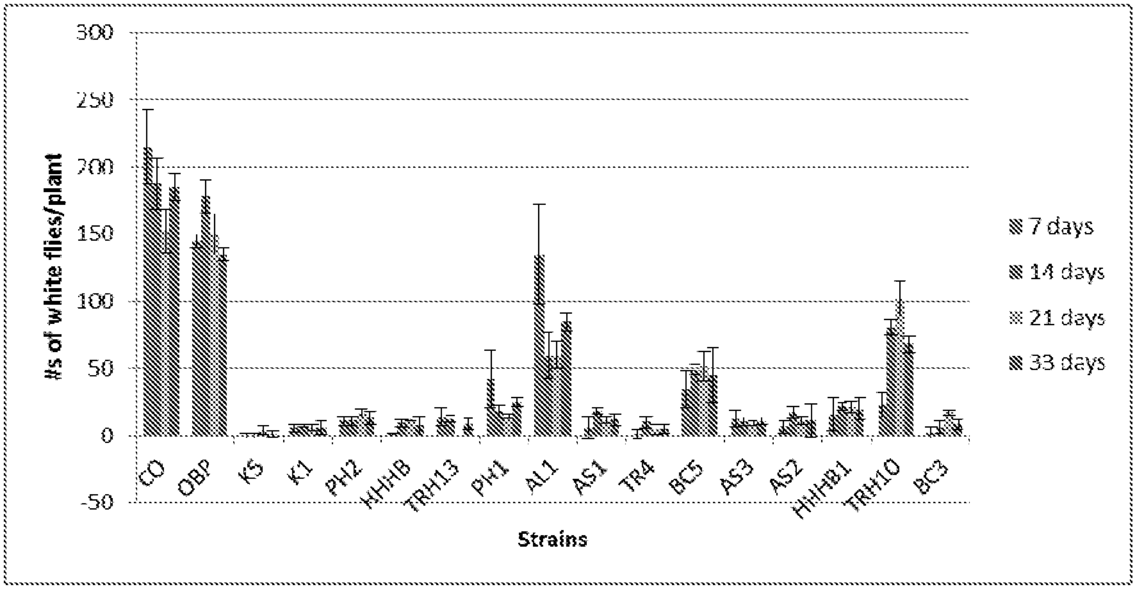

Results. The plants in their cages were retained and the same plants were again evaluated. It was expected that by this time, the toxic effects of the organisms would have dissipated. At two weeks the results were quite similar to those at one week. Given this, we continued the experiment but we also placed additional white flies into each cage by placing an infested plant into the cages with the treated ones. We did not have sufficient plants to treat all of the plants so those with the added infestations are in brown in the figure below (in the figure the cage with TRH13 also received added white flies but there were no live flies so there is no color), which is three weeks after treatment and five days after the supplemental white flies were provided. See FIGS. 17A-C. In FIG. 17A, This experiment was extended for another week and the results shown below are 33 days after application of the experimental materials. In FIG. 17B, Note that the total numbers of flies is lower than before, this is expected since the plants mature and the white fly colonies are less vigorous. Nonetheless, the numbers with the effective treatments are increasing between this and the previous treatments. This indicates, as would be expected, that these treatments are finally losing their efficacy. However, this extended length of control is outstanding and equal to almost any chemical insecticide. For summary and purposes of comparison, the entire data set is shown in FIG. 17C.

Figure 18:
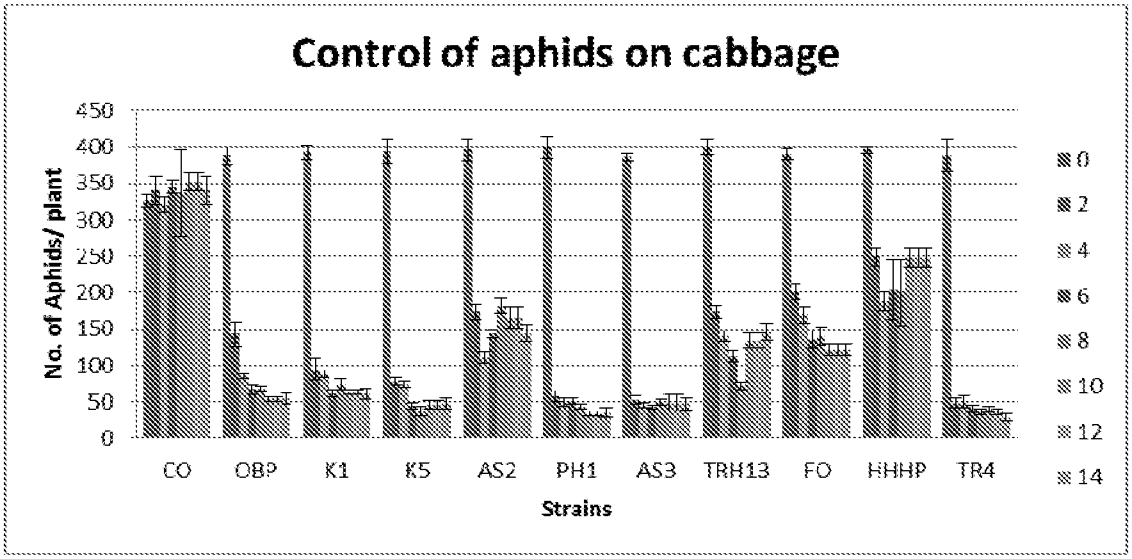
FIG. 18 shows data for controlling aphids.

Control of aphids. Another experiment was conducted, but this time with aphid (the cabbage aphid *Brevicoryne brassicae*) infestation of cabbage. The experimental plan was as described above. In this experiment, sprays were applied only at day 1, so long term control was obtained. Results are shown in FIG. 18. The experiments differed somewhat in the strains used, since we tested only the ones effective on white flies. FO was added, this is a formulation containing 1-octen-3-ol and no microorganisms. From the combined two experiments we make the following conclusions: (i) OPB kills white flies and aphids, with aphids more affected than white flies, (ii) some strains were highly effective. These included (a) *Trichoderma* strains K1 and K5, (b). *Bacillus* strains with consistent results across both experiments: TR4, As3, As2, and Ph1, and (iii) *Bacillus* strain with inconsistent results across the two experiments: HHHB and TRH13.

This experiment clearly demonstrates that some treatments which originally (1 week after application) appeared effective were less so after time. A good example is TRH10 which, 1 week after spraying the white flies were well controlled, but by three weeks they had redeveloped to a high level of infestation. This is probably an indication that there was a toxicant applied with the organism, but once the effect of this putative material was dissipated, then the flies could redevelop their populations.

Other strains had good initial activity and the effects continued at least three weeks. Exemplary results were with K1, K5, TRH13, AS2, and AS3. This effect must be due to induced resistance in the plants, so that they became plants upon which the flies could not obtain nutrition or that were directly toxic. This conclusion is buttressed by the fact that the plants continued to grow so the sprayed leaves were only a small part of the growing plants and so substantial portions of the plants were composed of unsprayed leaves. A systemic effect is required for the results obtained here. Tissue from these same plants will be collected and used for RNA SEQ experiments to define the tomato genes that are upregulated to give the proposed resistance effect. These results are highly useful commercially. One of the drawbacks of biological control is that the effects are only short-term. However, this data indicates that the effects can be long-term and can be highly effective if strains that induce systemic resistance are used. The possibility of infection and parasitism by the microbes is also a possible mechanism. The data also indicate that OPB itself has activity against white flies, but the activity of the microbial agents was at least additive to the effect of OPB. It is essential that biological agents be formulated appropriately, as with OPB, if they are to be effective.

Example 8

*Bacillus amyloliquifaciens* Strain As2 and Other *Bacillus* spp

Figure 19:
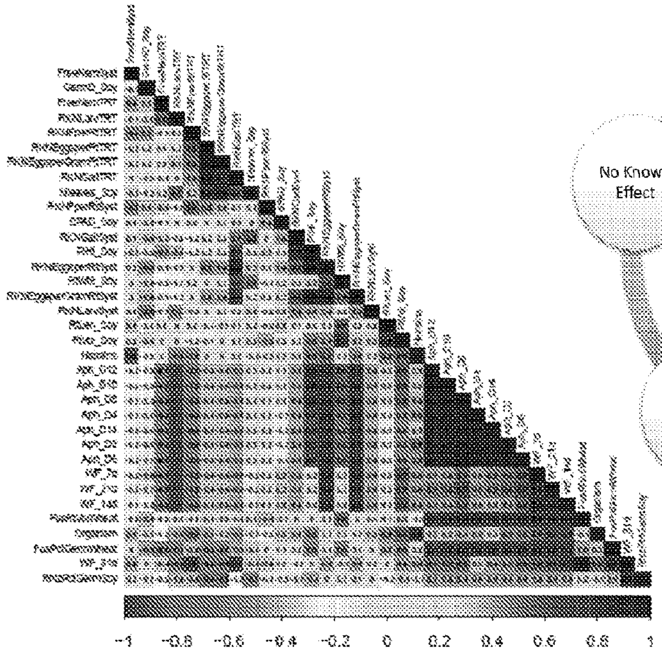
FIG. 19 is a diagram of correlations with activity of specific strains in different tests conducted in the greenhouse (soybeans based assays or, for white fly assays, on cucumbers, or in vitro inhibition by different strains of plant pathogens). Boxes that are dark blue show activities that are strongly correlated, and ones that are bright red are strongly negatively correlated. Lower degrees of positive or negative correlations are indicated by lighter or darker shades of blue and red, respectively.
Figure 19:
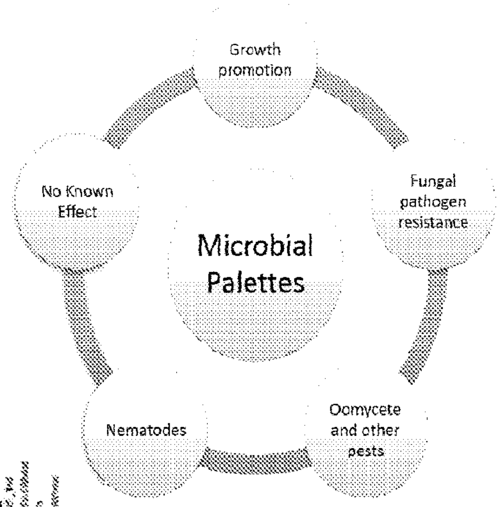

Discovery of novel *Bacillus* strains and the concept of Focused Microbial Diversity (FMD)™—Development of the concept of Focused Genetic Diversity™. Specific combinations of microbes, including multiple strains of *Trichoderma* and *Bacillus*, enhance plant productivity more than single strains of each. Specific microbes have "palettes" of unique activity, for example in their ability to control specific pathogens, insects or to increase plant growth and productivity. Desirable capabilities for agriculture are strictly strain specific and even within a specific microbial species, there is great diversity in capabilities. Within any species, individual strains will possess or lack desirable activities. This clearly demonstrates that, within species, specific strains can be identified that contain or lack particular genes, and that this largely explains their variations in activity. Both fungal and bacterial strains possess unique genes and there is great diversity within these organisms. This probably explains the "palettes" of activity. See FIG. 19, and legend below.

FIG. 19 Legend

| | |
|---|---|
| WF_7 d | Whitefly treatment timepoints |
| WF_14 d | |
| WF_21 d | |
| WF_31 d | |
| RhizPctGermSoy | Rhizoctonia on Soybean, % germination |
| FusPctGermWheat | Fusarium on Wheat, % germination |
| FusRtVolWheat | Fusarium on Wheat, root volume |
| RKNGallTRT | Root knot nematode, galling, treated pot |
| RKNGallSyst | Root knot nematode, galling, systemic pot |
| RKNRtWtTRT | Root knot nematode, root weight, treated pot |
| RKNRtWtSyst | Root knot nematode, root weight, systemic pot |
| RKNEggsperRtTRT | Root knot nematode, eggs/root, treated pot |
| RKNEggsperRtSyst | Root knot nematode, eggs/root, systemic pot |
| RKNEggsperGramRtTRT | Root knot nematode, eggs/gram root, treated pot |
| RKNEggsperGramRtSyst | Root knot nematode, eggs/gram root, systemic pot |
| RKNFperRtTRT | Root knot nematode, females/root, treated pot |
| RKNFperRtSyst | Root knot nematode, females/root, systemic pot |
| RKNLarvTRT | Root knot nematode, larvae, treated pot |
| RKNLarvSyst | Root knot nematode, larvae, systemic pot |
| FreeNemTRT | Root knot nematode, freeliving nematodes, treated pot |
| FreeNemSyst | Root knot nematode, freeliving nematodes, systemic pot |
| Aph_D2 | Aphid treatments |
| Aph_D4 | |
| Aph_D6 | |
| Aph_D8 | |
| Aph_D10 | |
| Aph_D12 | |
| Aph_D14 | |
| SPAD_Soy | SPAD meter readings, Soybean |
| RtLen_Soy | Root length, Soybean |
| RtVol_Soy | Root volume, Soybean |
| RtWt8_Soy | Root weight, Soybean |
| PlHt_Soy | Plant height, Soybean |
| Nleaves_Soy | Number of leaves, Soybean |
| GermD_Soy | Days to germination, Soybean |

Therefore, this must mean that there are great opportunities for synergy between strains. Further: We believe that the activity of these strains is primarily through metabolites that have antibiotic activity, interactions with plant receptors, and other activities. There is tremendous diversity in the range of these metabolites. *Bacillus* and *Trichoderma* probably have few, if any, in common. These metabolites have similar phenotypic effects on plants, but clearly by different mechanisms. We can identify the metabolites through biochemical means, and we probably have 50 or so candidates. We know most of the genes that encode these metabolites. Therefore, we can create novel and synergistic strain combinations by leveraging the specific strain genetics underlying their phenotypic palettes. Here we now have unique opportunities to transform plant agriculture and provide unique products, IP and scientific knowledge.

Palette concept—A substantial number of fungi in the genus *Trichoderma* are available in the collection held by ABM. In order to obtain bacteria in the genus *Bacillus*, a number of plant and plant based materials were heated for two hours at 45° C. *Bacillus* spp. are highly thermotolerant, and this heat treat suffices to inactive most other microorganisms. The plant materials were ground and bacteria were extracted by mixing with physiological saline. The resulting mixtures were diluted in the same medium and then plated onto potato dextrose agar (Difco Laboratories) or tripticase soy agar (Difco Laboratories). Plates were incubated at 30° C. and well-isolated colonies were removed from the isolating medium and streaked onto similar media. The plant or plant-related sources were from freshly dug potato tubers, hulls from wild hickory nuts dropped by foraging squirrels, tomato rhizosphere (tomato roots and adhering soil, turf grass rhizosphere, alfalfa stems and leaves, and composted hardwood bark. See FIG. 19 and legend above This process gave a total of 65 distinct strains of *Bacillus* spp., and these were subjected to the following selections: The ability to kill or otherwise control white flies; the ability to promote or enhance plant growth and productivity; the ability to inhibit growth a variety of fungal pathogens; the abilities of the range of bacterial strains to affect the criteria above is shown in FIGS. 3 and 4 of this section. From this analysis, it is apparent that different strains have very different activity profiles. A summary of these profiles is shown in diagrammatic form in FIGS. 3 and 4 of this section.

These data clearly demonstrate that different strains, even if they are in the same or similar species, have very different capabilities for plant growth enhancement, pathogen or insect control. For example, the ability of strains to control white flies was positively correlated with inhibition of *P. ultimum* and *S. nodorum*, but weakly or even negatively correlated with other attributes such as enhanced root volumes or SPAD meter ratings, which are two attributes with great value in improving plant growth and productivity. In data not shown, there was no positive correlation between species identification of strains and their abilities to perform any of the attributes shown in this section.

These data demonstrate that great diversity exists between strains and within species of *Bacillus*. Given this, it is possible to identify different strain groupings with different types of activities. For example, one group provides plant growth promotion, another controls *Pythium, Stagonospora nodorum* and white flies, a third has in vitro activity against many of the other pathogens shown above, and a fourth group has little or no detectable activity in any of these tests. These grouping are designated as palattes of activity. See FIG. 19.

Figure 20:
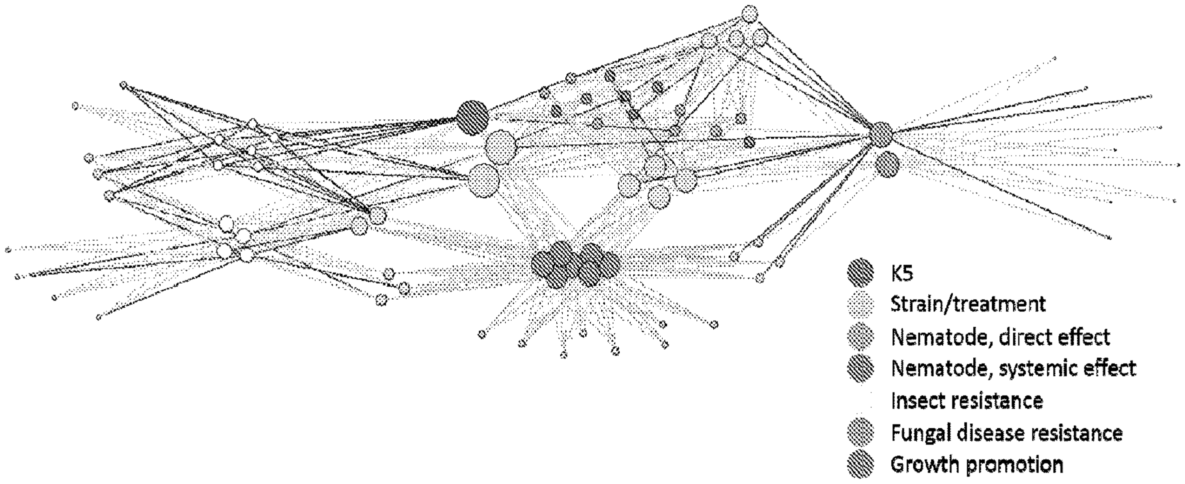
FIGS. 20A-B are network analyses of ABM strains showing relationship among strains having effects impacting traits shown (color coded per figure legend). Size of vertices indicates the number of times a vertex (trait or strain/treatment) was tested, thus large circles show repeated evaluations. Line colors indicate whether a strain surpasses the control for a given trait. Grey lines show equivalence with control, green lines 1 to 5× the control, and dark blue lines greater than 5 times the control.

Network analysis of ABM strains showing relationship among strains having effects impacting traits shown (color coded per figure legend). Size of vertices indicates the number of times a vertex (trait or strain/treatment) was tested, thus large circles show repeated evaluations. Line colors indicate whether a strain surpasses the control for a given trait. Grey lines show equivalence with control, green lines 1 to 5× the control, and dark blue lines greater than 5 times the control. See FIG. 20A-B.

Identity of As2 (NRRL______). In many of the earlier examples, *Bacillus* strain As2 was used together with various fungal strains, particularly K5. The following is documentation of its identity as a strain of *Bacillus amyloliquifaciens*. Partial genome sequence of ABM strain AS2 was generated using Oxford Nanopore Technologies MinION instrument as part of the early access program. Read lengths varied from approximately 100 bases to more than 6000 bases. A random sample of 500 reads was submitted to BLAST and the species identification of the resultant hits is summarized below. All of the sequences showing significant similarity to AS2 sequences are annotated as *Bacillus amyloliquifaciens* and we therefore designate this strain also as *B. amyloliquifaciens*.

Sequence Chart
Read distribution over species:

| Species | #Reads | % Reads |
|---|---|---|
| *B. amyloliquifaciens* subsp. *plantarum* TrigoCor1448 | 269 | 59.911 |
| *B. amyloliquifaciens* FZB42 | 49 | 10.913 |
| *B. amyloliquifaciens* UMAF6639 | 44 | 9.800 |
| *B. amyloliquifaciens* subsp. *plantarum* A543.3 | 36 | 8.018 |
| *B. amyloliquifaciens* UMAF6614 | 10 | 2.227 |
| *B. amyloliquifaciens* subsp. *plantarum* UCMB5033 | 9 | 2.004 |
| *B. amyloliquifaciens* subsp. *plantarum* UCMB5036 | 5 | 1.114 |
| *B. amyloliquifaciens* subsp. *plantarum* UCMB5113 | 5 | 1.114 |
| *B. amyloliquifaciens* subsp. *plantarum* NAU-B3 | 3 | 0.668 |
| *B. amyloliquifaciens* subsp. *plantarum* CAU B946 | 3 | 0.668 |
| *B. amyloliquifaciens* subsp. *plantarum* YAU B9601-Y2 | 2 | 0.445 |

Bases/proportion of genome evaluated: 121 contigs across approximately 5% of the *Bacillus amyloliquifaciens* reference genome (Strain DSM7; NCBI BioProject ID 41719) were evaluated for their similarity. A total of 8270 single nucleotide polymorphisms (SNPs) were detected between AS2 and the *B. amyloliquifaciens* reference genome over 584337 bases evaluated. This indicates that while there is significant identity to the reference genome (98.6% over the evaluated regions), a large number of SNPs were also found indicating that AS2 and the reference are different strains.

AS2 comparison with *B. amyloliquefaciens* strain TrigoCor 1448. In the determination of AS2 species the majority of reads showed significant similarity to *B. amyloliquefaciens* strain TrigoCor1488 (Crane J. M., M., et al., 2013). Therefore, the AS2 partial genome sequence was aligned to TrigoCor1488 to evaluate this relationship. Over the regions evaluated, 3130 SNPs were detected indicating 99.2% identity between the two strains. Thus, even the most closely related strain with sequence deposited in Genbank shows significant sequence differences with AS2. These differences demonstrate that this strain contains unique sequences not found in other strains.

Example 9

Supportive Data/Materials and Information

The use of endophytic microbes to overcome effects of stress in greenhouse studies. The purpose of this information was (a) to demonstrate the abilities of the endophytic microbes and others to overcome stress in a dicotyledenous plant, tomato, and (b) to demonstrate the inducible nature and some mechanisms of the response.

Methods. *Trichoderma* strains K1 (*T. virens* strain ATCC 20906), K2, K3, K4, and K5, *B. amyloliquifaciens* strain As2 as well as the combination of K1K4 (all four strains) and K5As2 were applied to potting soil (Sungrow) at the rate of 108 cfu/g soil for the *Trichoderma* strains and 109 cfg/g soil for As2. Five seeds were planted per pot, and after emergence plants were thinned to two/pot. All plants were treated identically with full greenhouse watering for five weeks and then on one set of three pots per treatment, watering was reduced to maintain a soil water capacity of 60-70% of saturation (measured by repeated weighing of pots). There were four replicates, each consisting of one pot with two plants (values of the two plants were averaged), and there were four replicates per treatment. This experiment was similar to another with tomatoes that gave very similar results. Temperatures were maintained at 20° C. to 25° C.

Various parameters were measured at the end of the 30 day stress period. These included plant heights and chlorophyll content (on the tip leaf of the 5th set of leaflets) estimated using a chlorophyll meter (SPAD-502, Minolta, LTD. Japan). In preliminary experiments results obtained with the SPAD instrument were similar to those using an extraction protocol (Casa, Castaldi, et al., 2015). In addition, photosynthetic efficiency was determined using chlorophyll fluorescence kinetics using a handy PEA (HansaTech) on the youngest fully developed leaf of per tomato plant. Leaves to be tested were dark-adapted for 30 min using the leaf clips (A preliminary experiment was conducted on tomato seedlings to determine the minimum period required for dark adaptation; data not shown). Determinations were carried out three to five hours after the start of the photoperiod. Several photosynthetic parameters were measured: minimal (FO) and maximal (Fm) fluorescence and the performance index (PI) are presented here since they were the most useful. Fv/Fm is a measure of the expression of the maximum quantum yield of primary photochemistry. The performance index is a parameter devised to quantify the effects of environmental factors on photosynthesis and that combines the three main functional steps taking place in PSII (light energy absorption, excitation energy trapping, and conversion of excitation energy to electron transport) (Strauss, Krueger, et al., 2006). PI was generated directly by software contained with the HansaTech apparatus. Both Fv/Fm and PI have been widely used as direct measures as a measure of biotic, abiotic or genetic interactions affecting photosynthesis (Christen, Schoenmann, et al., 2007, Ghotbi-Ravandi, Shahbazi, et al., 2014, Oukarroum, El Madidi, et al., 2007, Sheratmeti, Tripathi, et al., 2008).

Results. The results of this experiment are provided in the following figures. Bars with dissimilar letters are significantly different at P=0.05 (Agricola LSD tests). See FIGs. The variance around each measurement is shown by the error bars (standard deviations). Most of the treatments significantly increased the weight of tomato plants, with the best treatments, the increase was about 20%. The conditions of water stress were moderate, and slightly (but not significantly) decreased growth of tomatoes; this was overcome with the treatments.

Leaf greenness (correlated with chlorophyll content) in plants in the presence of the fungal strains varied in the absence of stress, but most treatments plants were greener than the control plants. In some cases, the differences were not significant, but in other cases they were. However, in the presence of stress and the beneficial fungi, levels of leaf greenness increased markedly up to about 50% more with K5As2 vs the untreated control.

Photosynthetic measures based on dark-adapted chlorophyll fluorescence on the same plants differed according to the units measured. Fv/Fm, which measures the maximum yield of photosystem II (Ghotbi-Ravandi, Shahbazi, et al., 2014), was mildly improved, but results were not significant (data not shown). Similar small effects of drought on this parameter were also shown in barley (Ghotbi-Ravandi, Shahbazi, et al., 2014). A more complex measure of photosynthesis is the Performance Index (PI). This parameter integrates the main photochemical process, including density of reaction centers, absorption and trapping of excitation energy and electron transfer beyond plastoquinone (Christen, Schoenmann, et al., 2007, Lepedus, Brkic, et al., 2012). However, in the absence of stress, the presence of the fungi increased the PI levels, and in the presence of stress, the PI values were much higher, by 80 to over 100%, relative to the nontreated nonstressed control and even more relative to the stressed controls. Thus, this complex measure of overall photosynthetic function was enhanced and activated by the combination of stress and the organisms, but decreased in stress in the absence of the microbes.

References. Altschul, S. F., Gish, W., Miller, W., Myers, E. W. & Lipman, D. J. (1990) "Basic local alignment search tool." J. Mol. Biol. 215:403-410; Cawoy, H., M. Mariutto, G. Henry, C. Fisher, N. Vasilyeva, P. Thonart, et al. 2014. Plant Defense Stimulation by Natural Isolates of *Bacillus* Depends on Efficient Surfactin Production. Molecular Plant-Microbe Interactions 27: 87-100. doi:10.1094/mpmi-09-13-0262-r.; Chupp, C. and A. F. Sherf. 1960. Vegetable Diseases and their Control The Ronald Press, New York.; Crane J. M., G. D. M., V. R. and B. G. C. 2013. Iturin levels on wheat spikes linked to biological control of *Fusarium* head blight by *Bacillus amyloliquefaciens*. Phytopathology 103: 146-155.; Danial, D. L. and J. E. Parlevliet. 1995. Effects of nitrogen fertilization on disease severity and infection type of yellow rust on wheat genotypes varying in quantitative resistance. Journal of Phytopathology (Berlin) 143: 679-681. doi:10.1111/j.1439-0434.1995.tb00222.x.; Djonovic, S., W. A. Vargas, M. V. Kolomiets, M. Horndeski, A. Weist and C. M. Kenerley. 2007. A proteinaceous elicitor Sm1 from the beneficial fungus *Trichoderma virens* is required for systemic resistance in maize. Plant Physiol. 145: 875-889; Goellner, K. and U. Conrath. 2008. Priming: it's all the world to induced disease resistance. European Journal of Plant Pathology 121: 233-242; Harman, G. E. 2000. Myths and dogmas of biocontrol. Changes in perceptions derived from research on *Trichoderma harzianum* T-22. Plant Dis. 84: 377-393; Harman, G. E. 2006. Overview of mechanisms and uses of *Trichoderma* spp. Phytopathology 96: 190-194; Harman, G. E. 2011. Multifunctional fungal plant symbionts: new tools to enhance plant growth and productivity. New Phytol. 189: 647-649; Harman, G. E. 2011. *Trichoderma*—not just for biocontrol anymore. Phytoparasitica 39: 103-108; Harman, G. E., A. G. Taylor and T. E. Stasz. 1989. Combining effective strains of *Trichoderma harzianum* and solid matrix priming to improve biological seed treatments. Plant Dis. 73: 631-637; Harman, G. E., C. R. Howell, A. Viterbo, I. Chet and M. Lorito. 2004. *Trichoderma* species—opportunistic, avirulent plant symbionts. Nature Rev. Microbiol. 2: 43-56; Harman, G. E., M. Cadle-Davidson, A. Pasquale and W. Nosir. 2015. Increasing photosynthetic efficiency and inducible resistance to drought and other stresses by application of endophytic fungi to the root phytobiome. Molec Plant Microbe Interact Submitted; Harman, G. E., R. Petzoldt, A. Comis and J. Chen. 2004. Interactions between *Trichoderma harzianum* strain vinT22 and maize inbred line Mo17 and effects of these interactions on diseases caused by *Pythium ultimum* and *Colletotrichum graminicola*. *Phytopathology* 94: 147-153; Harman, G. E., T. Bjorkman, K. L. Ondik and M. Shoresh. 2008. Changing paradigms on the mode of action and uses of *Trichoderma* spp. for biocontrol. Outlooks Pest Manag. 19: 24-29; Jaklitsch, W. M., Samuels, G. J., Dodd, S. L., Lu, B.-S., & Druzhinina, I. S. (2006). *Hypocrea rufa/Trichoderma viride*: a reassessment, and description of five closely related species with and without wanted conidia. Studies in Mycology, 56, 135-177; doi:10.3114/sim.2006.56.04; Jaskiewicz, M., U. Conrath and C. Peterhaensel. 2011. Chromatin modification acts as a memory for systemic acquired resistance in the plant stress response. EMBO Reports 12: 50-55. doi: 10.1038/embor.2010.186; Lindsey, D. L. and R. Baker. 1967. Effect of certain fungi on dwarf tomatoes grown under gnotobiotic conditions. Phytopathology 57: 1262-1263; Mastouri, F., T. Bjorkman and G. E. Harman. 2010. Seed treatments with *Trichoderma harzianum* alleviate biotic, abiotic and physiological stresses in germinating seeds and seedlings. Phytopathology 100: 1213-1221; Mastouri, F., T. Bjorkman and G. E. Harman. 2012. *Trichoderma harzianum* strain T22 enhances antioxidant defense of tomato seedlings and resistance to water deficit. Molec. Plant Microbe Interact. 25: 1264-1271; Morath, S. U., R. Hung and J. W. Bennett. 2012. Fungal volatile organic compounds: A review with emphasis on their biotechnological potential. Fungal Biol. Rev. 26: 73-83; Samuels G J (1996) *Trichoderma*: a review of biology and systematics of the genus. Mycol Res 100:923-935; Sayre, R. M., W. P. Wergin, J. M. Schmidt and M. P. Starr. 1991. *Pasteuria nishizawae* sp. nov., a mycelial and endospore-forming bacterium parasitic on cyst nematodes of genera *Heterodera* and *Globodera*. Res. Microbiology 142: 551-564; Sharon, E., M. Bar-Eyal, I. Chet, A. Herrera-Estrella, O. Kleifeld and Y. Spiegel. 2001. Biological control of the root-knot nematode *Meloidogyne javanica* by *Trichoderma harzianum*. Phytopathology 91: 687-693. doi:10.1094/phyto.2001.91.7.687; Shoresh, M. and G. E. Harman. 2008. The molecular basis of maize responses to *Trichoderma harzianum* T22 inoculation: a proteomic approach. Plant Physiol. 147: 2147-2163; Shoresh, M. and G. E. Harman. 2008. The relationship between increased growth and resistance induced in plants by root colonizing microbes. Plant Signal. Behavior 3: 737-739; Shoresh, M., A. Gal-on, D. Liebman and I. Chet. 2006. Characterization of a mitogen-activated protein kinase gene from cucumber required for *Trichoderma*-conferred plant resistance. Plant Physiol. 142: 1169-1179; Shoresh, M., F. Mastouri and G. E. Harman. 2010. Induced systemic resistance and plant responses to fungal biocontrol agents. Annu. Rev. Phytopathol. 48: 21-43; Vargas, W., F. Crutcher and C. Kenerley. 2010. Functional characterization of a plant-like sucrose transporter from the beneficial fungus *Trichoderma virens*. Regulation of the symbiotic association with plants by sucrose metabolism inside the fungal cells. New Phytol. 189: 777-789; Vargas, W. A., J. C. Mandawe and C. M. Kenerley. 2009. Plant-derived sucrose is a key element in the symbiotic association between *Trichoderma virens* and maize plants. Plant Physiol 151: 792-808; Waller, F., B. Achatz, H. Baltruschat, J. Fodor, K. Becker, M. Fischer, et al. 2005. The endophytic fungus *Piriformospora indica* reprograms barley to salt-stress tolerance, disease resistance, and higher yield. PNAS 102: 13386-13391; Yedidia, I., N. Benhamou and I. Chet. 1999. Induction of defense responses in cucumber plants (*Cucumis sativus* L.) by the biocontrol agent *Trichoderma harzianum*. Appl. Environ. Microbiol.

65: 1061-1070; nYedidia, I., N. Benhamou, Y. Kapulnik and I. Chet. 2000. Induction and accumulation of PR proteins activity during early stages of root colonization by the mycoparasite *Trichoderma harzianum* strain T-203. Plant Physiol. Biochem. 38: 863-873.Casa, R., F. Castaldi, S. Pascucci and S. Pignatti. 2015. Chlorophyll estimation in field crops: an assessment of handheld leaf meters and spectral reflectance measurements. Journal of Agricultural Science 153: 876-890. doi:10.1017/s0021859614000483; Christen, D., S. Schoenmann, M. Jermini, R. J. Strasser and G. Defago. 2007. Characterization and early detection of grapevine (*Vitis vinifera*) stress responses to esca disease by in situ chlorophyll fluorescence and comparison with drought stress. Environmental and Experimental Botany 60: 504-514. doi:10.1016/j.envexpbot.2007.02.003; Ghotbi-Ravandi, A. A., M. Shahbazi, M. Shariati and P. Mulo. 2014. Effects of mild and severe drought on photosynthetic efficiency in tolerant and susceptible barley (*Hordeum vulgare* L.) genotypes. j. Agron Crop Sci 200: 403-415; nLepedus, H., I. Brkic, V. Cesar, V. Jurkovic, J. Antunovic, A. Jambrovic, et al. 2012. Chlorophyll fluorescence analysis of photosynthetic performance in seven maize inbred lines under water-limited conditions. Periodicum Biologorum 114: 73-76; Oukarroum, A., S. El Madidi, G. Schansker and R. J. Strasser. 2007. Probing the responses of barley cultivars (*Hordeum vulgare* L.) by chlorophyll a fluorescence OLKJIP under drought stress and re-watering. Environmental and Experimental Botany 60: 438-446; Sheratmeti, I., S. Tripathi, A. Varma and R. Oelmueller. 2008. The root-colonizing endophyte Piriformospora indica confers drought tolerance in Arabidopsis by stimulating the expression of drought stress-related genes in leaves. Molec. Plant Microbe Interact. 21: 799-807; and Strauss, A. T., G. H. J. Krueger, R. J. Strasser and P. D. R. Van Heerden. 2006. Ranking of dark chilling tolerance in soybean genotypes probed by the chlorophyll a fluorescence transient O-J-I-P. Environmental and Experimental Botany 56: 147-157. doi:10.1016/j.envexpbot.2005.01.011.

The present invention is not to be limited in terms of the particular embodiments described in this application, which are intended as single illustrations of individual aspects of the invention. Many modifications and variations of this invention can be made without departing from its spirit and scope, as will be apparent to those skilled in the art. Functionally equivalent methods and apparatuses within the scope of the invention, in addition to those enumerated herein, will be apparent to those skilled in the art from the foregoing descriptions. Such modifications and variations are intended to fall within the scope of the appended claims. The present invention is to be limited only by the terms of the appended claims, along with the full scope of equivalents to which such claims are entitled. It is to be understood that this invention is not limited to particular methods, reagents, compounds compositions or biological systems, which can, of course, vary. It is also to be understood that the terminology used herein is for the purpose of describing particular embodiments only, and is not intended to be limiting. In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth. All patents, patent applications, provisional applications, and publications referred to or cited herein are incorporated by reference in their entirety, including all figures and tables, to the extent they are not inconsistent with the explicit teachings of this specification. Other embodiments are set forth within the following claims.

What is claimed is:

1. A composition consisting of:

a. a single microbial agent consisting of viable *Trichoderma gamsii* strain NRRL B50520, said strain possessing multifunctional capabilities selected from the group consisting of an increase in one or more beneficial plant attributes, said one or more beneficial plant attributes selected from the group consisting of plant growth, yield, root development, resistance to abiotic stresses, photosynthetic efficiency, reduction of foliar disease, controlling nematodes, inducing systemic changes in plant gene expression, remaining localized in the plant root system, protecting planted seeds from soil-borne pathogens, controlling populations of insect pests and combinations thereof, wherein the increase in the one or more beneficial plant attributes is as compared to a plant or plant system without the microbial agent;

b. an agronomic adjuvant mediator selected from the group consisting of humic acid, fulvic acid, a yeast extract, and mixtures thereof, wherein the agronomic adjuvant mediator does not naturally occur in combination with the microbial agent; and c. the composition, optionally, further consisting of one or more microbial metabolites selected from the group consisting of 6-pentyl pyrone, harzianic acid, hydtra 1, harzinolide, 1-octen-3-ol, sufactin, iturin, fengycin, polyketides and mixtures thereof.

2. The composition of claim 1, wherein the composition comprises the microbial metabolite 1-octen-3-ol.

3. The composition of claim 1, wherein the abiotic stresses are selected from the group consisting of drought, osmotic stress, an increased salinity, a decreased salinity, flooding and combinations thereof.

4. The composition of claim 1, wherein the increased photosynthetic efficiency increases more under stress conditions compared to unstressed conditions.

5. The composition of claim 1, wherein the one or more beneficial plant attributes is selected from the group consisting of:

a. controlling nematodes wherein the nematode control comprises one or more of: an inhibition of egg laying, a reduction in root galling, and a reduction in nematode numbers in soil surrounding roots;

b. controlling populations of insect pests wherein the insect pests are selected from the group consisting of white flies, aphids and combinations thereof, and c. protecting planted seeds from soil-borne pathogens wherein the soil-borne pathogens are selected from the group consisting of *Fusarium, Pythium, Rhizoctonia solani* and mixtures thereof.

6. The composition of claim 1, further consisting of one or more microbial metabolites selected from the group consisting of 6-pentyl pyrone, harzianic acid, hydtra 1, harzinolide, 1-octen-3-ol, sufactin, iturin, fengycin, polyketides and mixtures thereof.

* * * * *